(12) United States Patent
Reinhardt

(10) Patent No.: US 11,727,342 B2
(45) Date of Patent: *Aug. 15, 2023

(54) METHODS AND SYSTEMS FOR PRESCRIPTION DRUG SHIPPING SELECTION

(71) Applicant: Express Scripts Strategic Development, Inc., St. Louis, MO (US)

(72) Inventor: Jacob J. Reinhardt, Wentzville, MO (US)

(73) Assignee: Express Scripts Strategic Development, Inc., St. Louis, MO (US)

(*) Notice: Subject to any disclaimer, the term of this patent is extended or adjusted under 35 U.S.C. 154(b) by 308 days.

This patent is subject to a terminal disclaimer.

(21) Appl. No.: 17/123,433

(22) Filed: Dec. 16, 2020

(65) Prior Publication Data

US 2021/0103885 A1 Apr. 8, 2021

Related U.S. Application Data

(63) Continuation of application No. 14/630,373, filed on Feb. 24, 2015, now Pat. No. 10,909,492.

(Continued)

(51) Int. Cl.
*G06Q 10/08* (2023.01)
*G06Q 10/0832* (2023.01)
*G06Q 10/0833* (2023.01)

(52) U.S. Cl.
CPC ..... *G06Q 10/0832* (2013.01); *G06Q 10/0833* (2013.01)

(58) Field of Classification Search
CPC ........................... G06Q 10/08; G06Q 10/0832

(Continued)

(56) References Cited

U.S. PATENT DOCUMENTS 4,262,494 A 4/1981 Karow, Jr.
5,417,082 A 5/1995 Foster
(Continued)

FOREIGN PATENT DOCUMENTS

| CN | 2172444 Y | 7/1994 | |
|---|---|---|---|
| EP | 1107150 A2 * | 6/2001 | ............. G06Q 10/08 |
| EP | 11071502 A | 6/2001 | |

OTHER PUBLICATIONS

Shafaat et al. "An Overview: Storage of Pharmaceutical Products" Oct. 2013, World Journal of Pharmacy and Pharmaceutical Sciences 2(5): 2499-2515 (Year: 2013).*

(Continued)

*Primary Examiner* — Shannon S Campbell
*Assistant Examiner* — Freda A Nelson
(74) *Attorney, Agent, or Firm* — Miller Johnson

(57) ABSTRACT

Methods and systems for prescription drug shipping selection are provided. In one embodiment, a shipping temperature for a prescription drug may be identified. A forecast temperature may be determined for a shipping origin and a forecast temperature may be determined for a shipping destination. One or more potential packing configurations capable of achieving the shipping temperature between the shipping origin and the shipping destination may be determined. A shipping cost for each of the one or more potential packing configurations may be calculated. Packaging materials and labor cost may additionally be considered. Other methods and systems are described.

15 Claims, 11 Drawing Sheets

Related U.S. Application Data

(60) Provisional application No. 61/943,579, filed on Feb. 24, 2014.

(58) Field of Classification Search
USPC .................................................. 705/332, 333
See application file for complete search history.

(56) References Cited

U.S. PATENT DOCUMENTS

| | | | |
|---|---|---|---|
| 5,441,170 A | 8/1995 | Bane, III | |
| 5,827,385 A | 10/1998 | Meyer | |
| 5,924,302 A | 7/1999 | Derifield | |
| 5,956,968 A | 9/1999 | Grabowski | |
| 5,979,693 A | 11/1999 | Bane, III | |
| 6,397,163 B1* | 5/2002 | Hoyt | G06Q 10/08 206/559 |
| 6,536,189 B1 | 3/2003 | Murray | |
| 6,868,982 B2 | 3/2005 | Gordon | |
| 6,875,486 B2 | 4/2005 | Miller | |
| 6,886,357 B2 | 5/2005 | Gano, III | |
| 6,968,711 B2 | 11/2005 | Smith | |
| 7,028,504 B2 | 4/2006 | Derifield | |
| 7,130,771 B2 | 10/2006 | Aghassipour | |
| 8,050,942 B1* | 11/2011 | Ali | G06Q 10/087 705/2 |
| 8,600,903 B2 | 12/2013 | Eller | |
| 8,707,658 B2* | 4/2014 | Schafer | B65G 1/1378 414/268 |
| 9,518,873 B2* | 12/2016 | Bellamkonda | G01K 7/42 |
| 2002/0004724 A1 | 1/2002 | Eastman | |
| 2003/0014994 A1 | 1/2003 | Smith | |
| 2004/0200232 A1 | 10/2004 | Gano, III | |
| 2004/0243353 A1* | 12/2004 | Aghassipour | G06Q 10/047 702/187 |
| 2007/0028642 A1 | 2/2007 | Glade | |
| 2007/0193297 A1 | 8/2007 | Wilson | |
| 2008/0308452 A1 | 12/2008 | Eller | |
| 2011/0022532 A1* | 1/2011 | Kriss | G06Q 10/0833 705/332 |
| 2014/0352334 A1 | 12/2014 | Barakat | |

OTHER PUBLICATIONS

"The Cold Chain: Part Two", Winter 2013, Pharmacy Connection, 3 pages, (Year: 2013).*

Hallie Forcinio, "Seeking Cold Chain Efficiency"; Feb. 2, 2013, pharmtech.com, Pharmaceutical Technology: vol. 37, Issue 2, 5 pages. (Year: 2013).*

Claude Ammann, "Handling Temperature Excursions and the Role of Stability Data", Sep. 25, 2013; pharmoutsourcing.com; 6 pages. (Year: 2013).*

An Overview: Storage of Pharmaceutical Products, Oct. 2013; vol. 2, Issue 5, 2499-2515, World Journal of Pharmacy and Pharmaceutical Sciences, 18 pages (Year: 2013).

* cited by examiner

METHODS AND SYSTEMS FOR PRESCRIPTION DRUG SHIPPING SELECTION

CROSS-REFERENCE TO A RELATED APPLICATION

This application is a continuation of U.S. application Ser. No. 14/630,373 which was filed Feb. 24, 2015 and which claims the benefit of U.S. provisional patent application 61/943,579 filed on 24 Feb. 2014, entitled "METHODS AND SYSTEMS FOR PRESCRIPTION DRUG SHIPPING SELECTION". The entire disclosures of these applications are incorporated herein by reference.

FIELD

The field relates to the delivery of drugs, and more particularly relates to delivery of prescription drugs having temperature control requirements to patients.

BACKGROUND

Mail order pharmacies provide a convenient and cost effective option for patients to receive prescription drugs. For example, a mail order pharmacy may be capable of taking advantage of economies of scale, volume dispensing of prescription drugs, and centralized warehousing and shipping to reduce the cost of prescription drugs purchased by patients of the mail order pharmacy. Some types of prescription drugs may have temperature-related storage and handling requirements in order to maintain the safety and efficacy of the drugs. Such drugs may typically be shipped from a mail order pharmacy to the patient, doctor, nurse, treatment facility, or the like using insulated and/or temperature controlled shipping containers.

DETAILED DESCRIPTION

Figure 1:
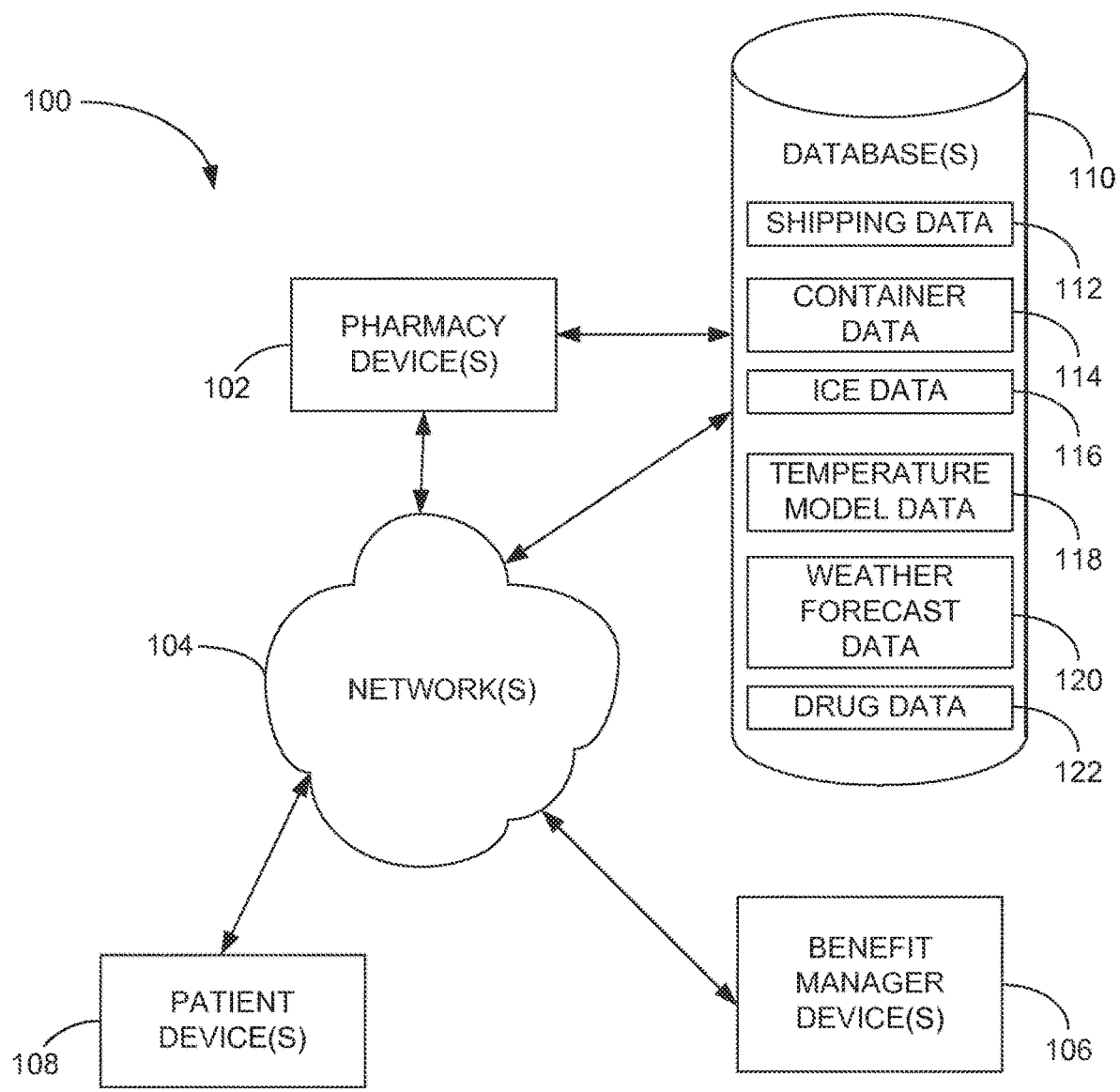
FIG. 1 is a block diagram of an example system, according to an example embodiment.

Example methods and systems for prescription drug shipping selection are described. In the following description, for purposes of explanation, numerous specific details are set forth in order to provide a thorough understanding of example embodiments. It will be evident, however, to one of ordinary skill in the art that embodiments of the invention may be practiced without these specific details.

Some types of prescription drugs may have temperature-related storage and handling requirements in order to maintain the safety and efficacy of the drugs. Because of the need for maintaining control of the temperature of such drugs, the drugs may typically be shipped from a mail order pharmacy to a customer or purchaser of the prescription drug (e.g., a patient of the pharmacy or a physician treating a patient) using insulated and/or temperature controlled shipping containers. In general, temperature controlled shipping containers may include shipping containers that have been configured to have at least some selected materials as part of the shipping container (e.g., the walls of the shipping container) that provide a rate of heat exchange with the environment (e.g., an insulator). An insulator is designed to minimize the heat exchange between two temperature environments. In general, temperature controlled shipping containers may include shipping containers that have been configured to have at least some selected materials that preserve the temperature within the shipping container for a period of time. Generally speaking, the materials that preserve the temperature within the shipping container for a period of time may include phase change materials. Phase change materials include substances that exist as solid, liquid, and/or gas phases depending on temperature, and release or absorb heat over a period of time while undergoing a phase transformation. Temperature controlled shipping containers may have more materials, be more expensive, and/or be larger than shipping containers that are not temperature controlled. Thus, drug shipping selection may include, for example, the use of insulated shipping containers such as coolers as temperature controlled shipping containers to ship the prescription drug to a customer. Additionally, the drug shipping selection may include the use of phase change units, such as frozen or liquefied gel packs, frozen or liquefied water packs, or other materials, included within the shipping container along with the drugs. The phase change units may, for example, maintain the internal temperature of the cooler within a desired temperature range (e.g., based upon, at least in part, the temperature requirements for the drug) throughout the shipping duration for transporting the drugs from the mail order pharmacy to the customer.

The cost of transporting the temperature sensitive drug to the customer may include the cost of the shipping container, the cost of the phase change units, and the cost of shipping the container via the shipping carrier or vendor, as well as various other costs (which may, or may not, be specific to shipping temperature sensitive drugs as compared to shipping drugs that are not temperature sensitive). The cost of the shipping container may vary based on the size, density, and wall thickness of the container. For example, larger, more dense and thicker walled containers may be differently priced than smaller, less dense, and thinner walled containers. The cost of phase change units may vary based on the number of phase units, and will add or remove weight to a shipping container. The cost of shipping the temperature sensitive drugs may vary, for example, based on the size and weight of the shipping container (including the drugs and phase change units contained therein), the mode of shipping (e.g., ground, air, as well as speed of shipping, such as overnight, two day, etc.), and the shipping carrier. Consistent with an embodiment, various possible shipping arrangements may be compared, and a cost effective shipping arrangement may be selected for delivering a shipment of temperature sensitive drugs to the customer. The shipping arrangement may include variables such as, the drug being shipped, shipping container size, shipping mode, and the number of phase change units determined to be necessary to maintain the desired temperature of the drugs for the shipping duration of the specific shipping mode. In some embodiments, the size of the shipping container may be based upon, at least in part, the number of phase change units required to maintain the desired temperature of the drugs and the container size of the drugs. Further, in an embodiment, the number of phase change units required to maintain the desired temperature of the drugs may be based upon, at least in part, the shipping mode, the shipping container size, and the temperatures to be experienced from packing, through shipment, and extending until or exceeding delivery. In an embodiment, the number of phase change units necessary to maintain a desired temperature of the drugs may be based upon, at least in part, a coefficient of heat transfer obtained through experimental modeling and/or the wall thickness of the shipping container.

FIG. 1 is a block diagram of an example system 100, according to an example embodiment. The system 100 is an example embodiment in which the packaging and/or shipment of temperature sensitive drugs may be managed. The system 100 includes a pharmacy device 102 in communication with a benefit manager device 106 over a network 104. The system may also include a patient device 108.

The pharmacy device 102 may include hardware and/or software of a mail order pharmacy and/or or a retail pharmacy to enable the pharmacy to fulfill prescription drug orders. The pharmacy device 102 may be operated in an automated manner, as directed by an operator (e.g., a pharmacist or pharmacist technician), or otherwise. Examples of pharmacy operations that may be performed by pharmacy device 102 include filling a prescription after removing pharmaceuticals from inventory, labeling a container or other packaging with prescription information, filling the container or other packaging with the pharmaceutical, verifying the type and quantity of the pharmaceutical in the container with that which is printed on the label, and the like. In some embodiments, the pharmacy device 102 may be used to determine how to select and prepare a shipping container to mail prescription drugs.

In some embodiments, the pharmacy device 102 may be a device associated with a retail pharmacy location (e.g., an exclusive pharmacy location, a grocery store with a retail pharmacy, or a general sales store with a retail pharmacy) or other type of pharmacy location from which an individual (e.g., as a patient of a pharmacy and/or a member of a benefit plan) attempts to obtain a prescription. In some embodiments, the pharmacy device 102 may be utilized by the pharmacy to submit the claim to the pharmacy benefit manager (PBM) for adjudication (e.g., when the patient of the pharmacy is a member of a benefit plan offered by the PBM). Additionally, in some embodiments, the pharmacy device 102 may enable information exchange between the pharmacy and the PBM, for example, to allow the sharing of member information such as drug history, and the like, that may allow the pharmacy to better service a member (e.g., by providing more informed therapy consultation and drug interaction information).

In some embodiments, the pharmacy device 102 may be associated with a mail order pharmacy. The mail order pharmacy may fill or refill the prescription, and may deliver the prescription drug to the member via a parcel service in accordance with an anticipated need, such as a time-wise schedule, or the like. As such, a person or patient may not need to visit the retail pharmacy store in person to have the prescription refilled and/or to pick up the refilled prescription. In addition to the convenience of receiving the refills of the prescription directly to the patient's home or other designated location of delivery, the cost of the prescription drugs purchased through a mail order delivery pharmacy may be less than the cost of the same prescription drugs purchased from a retail pharmacy. The lower costs available through the mail order pharmacy may be the result, for example, of economies of scale available to the mail order pharmacy that may be at least partially passed along to the member as well as the savings realized by the client. The lower costs available through the mail order pharmacy may be the result of a lower co-pay required by the patent in the role of a member of a health care plan, under which the member may receive the prescription drugs.

Examples of the devices 102, 106, 108 include a set-top box (STB), a receiver card, a mobile telephone, a personal digital assistant (PDA), a display device, a portable gaming unit, and a computing system; however other devices may also be used. For example order processing device 1102 may include a mobile electronic device, such an IPHONE or IPAD device by Apple, Inc. mobile electronic devices powered by ANDROID by Google, Inc. and a BLACKBERRY device by Research In Motion Limited. The devices 102, 106, 108 may also include other computing devices, such as desktop computing devices, notebook computing devices, netbook computing devices, gaming devices, and the like. The devices 102, 106, 108 may include a processor, a memory to store data and instructions, and communication functionality. Other types of electronic devices may also be used. Other types of electronic devices may also be used. In some embodiments, the devices 102, 106, 108 when executing the method steps described herein, are a specific machine dedicated to the present disclosure.

Examples of the network 104 include Mobile Communications (GSM) network, a code division multiple access (CDMA) network, 3rd Generation Partnership Project (3GPP), 4th Generation Partnership Project (4GPP), an Internet Protocol (IP) network, a Wireless Application Protocol (WAP) network, a WiFi network, or an IEEE 802.11 standards network, as well as various combinations thereof. The network 104 may include optical communications. The network 104 may be a local area network or a global communication network, such as the Internet. Other conventional and/or later developed wired and wireless networks may also be used. In some embodiments, the network 104 may include a prescribing network such as the electronic prescribing network operated by Surescripts of Arlington, Va.

The benefit manager device 106 is a device operated by an entity at least partially responsible for creation and/or management of the pharmacy or drug benefit. While the benefit manager operating the benefit manager device 106 is typically a pharmacy benefit manager (PBM), other entities may operate the benefit manager device 106 either on behalf of themselves, the PBM, or another entity. In some embodiments, a PBM that provides the pharmacy benefit may also provide one or more than one additional benefits including a health benefit, a dental benefit, a vision benefit, a wellness benefit, a radiology benefit, a pet care benefit, an insurance benefit, a long term care benefit, a nursing home benefit, and the like.

Some of the operations of the PBM that operates the benefit manager device 106 may include the following. A member (or a person on behalf of the member) of a pharmacy benefit plan administered by or through the PBM attempts to obtain a prescription drug at a retail pharmacy location where the member can obtain drugs in a physical store from a pharmacist or pharmacist technician, or in some instances through mail order drug delivery from a mail order pharmacy location. The member may also obtain a prescription drug directly or indirectly through the use of a machine, such as a kiosk, vending unit, mobile electronic device, or a different type of mechanical, electrical, and/or computing device.

The member may have a co-pay for the prescription drug that reflects an amount of money that the member is responsible to pay the pharmacy for the prescription drug. The money paid by the member to the pharmacy may come from the personal funds of the member, a health savings account (HSA) of the member or the member's family, a health reimbursement arrangement (HRA) of the member or the member's family, a flexible spending accounts (FSA) of the member or the member's family, or the like. An employer of the member may directly or indirectly fund or reimburse the member or an account of the member for the co-pay.

The amount of the co-pay paid by the member may vary by the benefit plan of the client with the PBM. The member's co-pay may be based on be a flat co-pay (e.g., $10), co-insurance (e.g., 10%), and/or a deductible (e.g., for first $500 of annual prescription drug spend) for certain prescription drugs, certain types of prescription drugs, and/or all prescription drugs.

The amount of the co-pay paid by the member may vary by the benefit plan of a plan sponsor or client with the PBM. The member's co-pay may be based on a flat co-pay (e.g., $10), co-insurance (e.g., 10%), and/or a deductible (e.g., for first $500 of annual prescription drug spend) for certain prescription drugs, certain types of prescription drugs, and/or all prescription drugs.

In certain instances, the member may not pay the co-pay or may only pay for a portion of a co-pay for a prescription drug. For example, if the usual and customary cost for a generic version of a prescription drug is $4, and the member's flat co-pay is $20 for the prescription drug, the member may only pay $4 to receive the prescription drug. In another example involving a worker's compensation claim, no co-pay may be due by the member for the prescription drug.

In conjunction with receiving the co-pay (if any) from the member and dispensing the prescription drug to the member, the pharmacy submits a claim to the PBM for the prescription drug. The PBM may perform certain adjudication operations including verifying the eligibility of the member, reviewing the formulary of the member to determine appropriate co-pay, coinsurance, and deductible for the prescription drug, and performing a drug utilization review (DUR) on the member. The PBM then provides a response to the pharmacy following performance of the aforementioned operations. As part of the adjudication, the plan sponsor (or the PBM on behalf of the plan sponsor) ultimately reimburses the pharmacy for filling the prescription drug when the prescription drug was successfully adjudicated. The aforementioned adjudication operations generally occur before the co-pay is received and the prescription drug dispensed. However, the operations may occur simultaneously, substantially simultaneously, or in a different order. In addition, more or less adjudication operations may be performed as at least part of the adjudication process.

The amount of reimbursement paid to the pharmacy by a plan sponsor and/or money paid by the member may be based at least in part on the type of pharmacy network in which the pharmacy is included. Other factors may be used to determine the amount in addition to the type of pharmacy network. For example, if the member pays the pharmacy for the prescription without using the prescription drug benefit provided by the benefit manager, the amount of money paid by the member may be higher and the amount of money received by the pharmacy for dispensing the prescription drug and for the prescription drug itself may be higher. Some or all of the foregoing operations may be performed by executing instructions on the benefit manager device 106 and/or an additional device.

In some embodiments, the pharmacy device 102 and/or the benefit manager device 106 are operated by a single entity. In other embodiments, the pharmacy device 102 and/or the benefit manager device 106 are operated by different entities. In some embodiments, the pharmacy device 102 and/or the benefit manager device 106 are jointly operated (e.g., on a single device or on a pool of devices), while in other embodiments, the pharmacy device 102 and the benefit manager device 106 are operated separately.

The patient device 108 is used by a device operator. The device operator may be an individual acting as a patient of a pharmacy, a member of a drug benefit program, or otherwise. While some illustrative embodiments may generally describe the device operator as a member, the device operator may be an individual not in the role of a member. In some embodiments, the device operator may be a patient of a pharmacy who is not a member of the PBM. In addition, the device operator may be another person operating the patient device 108 on behalf of the member. Examples of such people include parents, guardians and caregivers. While the member is generally described herein as being the device operator, generally any of the aforementioned persons may be substituted for the member.

In some embodiments, the member may utilize the patient device 108 to communicate with the benefit manager (e.g., through the benefit manager device 106) or a pharmacy (e.g., through the pharmacy device 102).

By way of example, the patient device 108 may communicate with the benefit manager device 106 to enable a member to have a prescription filled through a pharmaceutical delivery channel. The member operating the patient device 108 may be a person who has one or more prescription drugs prescribed to them by a medical healthcare professional.

The patient device 108 may be associated with a single member, or with multiple members. A member may use multiple patient devices. In some embodiments, the communication may not be made to the member directly through the patient device 108. For example, the member may get blocked at a retail pharmacy location from receiving a prescription drug under the drug benefit program associated with the member and then receive the notification from the pharmacist regarding the blockage. The member may also receive a letter in the mail or by email explaining the blockage.

The pharmacy device 102 and/or the benefit manager device 106 may be in communication directly (e.g., through local storage) and/or through the network 104 (e.g., in a cloud configuration or software as a service) with a device that stores a database 110. The database 110 may be deployed on the pharmacy device 102, the benefit manager device 106, both the pharmacy device 102 and the benefit manager device 106, partially on the pharmacy device 102 and partially on the benefit manager device 106, on a separate device, or may otherwise be deployed. The database 110 may store shipping data 112, container data 114, ice data 116, temperature model data 118, weather forecast data 120, and drug data 122.

In general, the shipping data 112 may include information regarding the pricing of various shipping modes offered by multiple different shipping carriers. The various shipping modes may include combinations of transport duration and transport type. Transport duration may include, for example, next day shipping, second day shipping, three day shipping, etc. Transport type may include, for example, air shipping transport, ground shipping transport, hand carrier delivery, etc. The pricing of the various shipping modes may additionally include pricing information based on different package weights, sizes, and/or types, and may be imposed with different charges (e.g., fuel surcharge, residential delivery charge, delivery area surcharge, Saturday delivery charge, etc.) by the different shipping carriers. Additionally, the different shipping carriers may price differently. For example, the base shipping charge may be a different price, and additionally one of the carriers may charge an additional special fee for a particular delivery location while the other may not or may charge a different special fee for a different reason. In some embodiments, the shipping data 112 may also include information regarding pick-up times and/or delivery times for individual shipping modes and/or carriers. In some embodiments, the shipping data 112 may additionally include a route of transit.

The shipping data 112 may be created and stored by the pharmacy operating the pharmacy device 102, the benefit manager operating the benefit manager device 106, and/or one, or more than one, shipping carrier. For example, the shipping carrier may store the shipping data 112 associated with itself directly in the database 110, or may provide information to the pharmacy such that the pharmacy device 102 stores the provided information in the form of the shipping data 112. The shipping data 112 may include data provided by the shipping carriers, data generated by the pharmacy device 102 and/or the benefit manager device 106 regarding the shipping carriers and/or its services, or otherwise.

The container data 114 may include information regarding different available insulated shipping containers utilized by the mail order pharmacy for shipping temperature sensitive drugs. The shipping container information may include, for example, the different available cooler sizes, the weight of each of the different available cooler sizes, the cost of each of the different available cooler sizes, and the size (e.g., physical external dimensions, physical internal dimensions, physical internal volume, shipping mode specific dimensional weight, shipping mode specific dimensional volume, and/or maximum weight carrying capacity) of each of the different available cooler sizes. Additional information, such as insulating characteristics (e.g., wall thickness, K value and/or R value) of each of the different cooler sizes may also be stored as part of the container data 114. The container data 114 may include data provided by the shipping carriers, data provided by the container manufacturers, data generated by the pharmacy device 102 and/or the benefit manager device 106 regarding the containers and/or its manufacturers, or otherwise.

The ice data 116 may include, for example, information regarding the available phase change units that may be utilized by the pharmacy for shipping temperature sensitive drugs. Examples of phase change units may include, for example, frozen gel packs, which may undergo a phase change or partial phase change to liquid form while absorbing heat and maintaining constant temperature within a cooler, and liquefied gel packs, which may undergo a phase change or partial phase change to solid form while releasing heat and maintaining constant temperature within a cooler. The ice data 116 may include, for example, the weight of each frozen and/or liquefied gel pack, the cost of each frozen and/or liquefied gel pack, the physical dimensions of each frozen and/or liquefied gel pack, and/or the volume of each frozen and/or liquefied gel pack. In some embodiments multiple sizes (e.g., physical dimensions and/or weight) of frozen and/or liquefied gel packs, and/or types (e.g., different chemical compositions and/or melting points) of frozen and/or liquefied gel packs are used. The ice data 116 may include data provided by the shipping carriers, data provided by the container manufacturers, data provided by the phase change unit manufacturers, data generated by the pharmacy device 102 and/or the benefit manager device 106 regarding the phase change unit and/or its manufacturers, or otherwise.

The temperature model data 118 may include experimentally obtained and/or determined information regarding the different internal temperature vs. time profiles associated with different cooler, external temperature, and frozen and/or liquefied gel pack combinations. For example, the temperature model data 118 may include experiment information regarding the duration for which a specified temperature (e.g., which may include a specified temperature range, and/or a temperature below a specified threshold temperature) may be maintained within different sized coolers having different numbers of frozen gel packs (and/or liquefied gel packs, and/or combinations of frozen and liquefied gel packs) disposed within the cooler under different external conditions and different durations. In some embodiments, the temperature model data 118 may include temperature modeling equations utilizing the many aforementioned variables (e.g., cooler, gel packs, external conditions, and duration). Additional variables or a lesser number of variables may also be used. In some embodiments, the temperature model data 118 may be utilized for improving accuracy through experimental results (e.g., by modifying a variable within the temperature modeling equations to achieve equivalent internal temperature profiling given an external temperature, cooler, and frozen and/or liquefied gel pack combination). In other embodiments, the temperature model data 118 may be exclusively based on experimental results. In such a model, a very large array of experimental results may be collected, as there may be many variables that affect the internal temperature of a cooler, and many possibilities of external temperature profiles. In some embodiments, the temperature model data 118 may be received from the FDA, directly from the manufacturer, or otherwise and stored in the database 110.

The weather forecast data 120 may include forecast temperatures associated with different geographic locations, such as with a geographic location of the pharmacy and a geographic location of a destination of a temperature sensitive drug shipment. In some embodiments, the weather forecast data 120 may include forecast temperatures associated with several geographic locations exceeding geographic locations of the pharmacy and destination of a temperature sensitive drug shipment, for example at several intermediary points in between the pharmacy and destination or along the expected shipping route. In some embodiments, the weather forecast data 120 may include a forecast high temperature and a forecast low temperature for each day and for each geographic location. In some embodiments, the weather forecast data 120 may include forecast hourly temperatures for each geographic location. In some embodiments, the weather forecast data 120 may be continuously and/or intermittently updated.

The weather forecast data 120 may be created and stored by the pharmacy operating the pharmacy device 102, the benefit manager operating the benefit manager device 106, and/or one, or more than one, weather forecasting services and/or devices. For example, the weather forecasting service may store its weather forecast data 120 in the database 110, or may provide information to such a device 102, 106 (e.g., through an application programming interface) in the form of the weather forecast data 120 and/or in the form of data that is converted into the weather forecast data 120.

The drug data 122 may include drug name (e.g., technical name and/or common name), other names by which the drug is known by, active ingredients, an image of the drug (e.g., in pill form), and the like. The drug data 122 may include a dosage format (e.g., pill, spray, or liquid) and/or the packaging formats (e.g., filled bottle, filled blister packaging, or pre-filled unit of use packaging), that are available to or for the drug. The drug data 122 may include information associated with a single medication or multiple medications.

The drug data 122 may include information regarding each drug that may require temperature controlled storage. The information regarding the drugs may include, for example, the size of different containers for the drug, the weight of the drug, and a recommended storage temperature for the drug. The size of the different containers for the drug may include, for example, the physical dimensions of each container and/or the volume of the container. The weight of the drug may include, for example, the combination weight of the drug and packaging container. The recommended storage temperature may include, for example, a minimum storage temperature, a maximum storage temperature, and the like. In some embodiments the drug data 122 may additionally include drug information related to allowable excursion outside of the recommended storage temperature range (e.g., absolute minimum temperature, allowed duration below the minimum storage temperature, absolute maximum temperature, and/or allowed duration above the maximum storage temperature). The drug data 122 may include data provided by the drug manufactures, data provided by governmental organizations, data generated by the pharmacy device 102 and/or the benefit manager device 106 regarding the drugs, or otherwise.

While the system 100 in FIG. 1 is shown to include single devices 102, 106, 108 multiple devices may be used. The devices 102, 106, 108 may be the same type of device or may be different device types. When multiple devices are present, the multiple devices may be of the same device type or may be a different device type. Moreover, system 100 shows a single network 104, however, multiple networks can be used. The multiple networks may communicate in series with each other to link the devices 102, 106, 108 or in parallel to link the devices 102, 106, 108.

Figure 2:
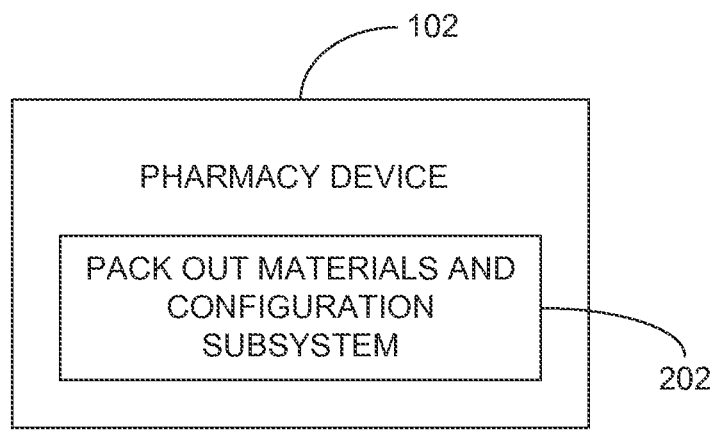
FIG. 2 is a block diagram of an example pharmacy device that may be deployed within the system of FIG. 1, according to an example embodiment.

FIG. 2 illustrates the pharmacy device 102, according to an example embodiment. The pharmacy device 102 may be used by a device operator to determine a desired shipment configuration for a temperature sensitive drug. The pharmacy device 102 may be deployed in the system 100, or may otherwise be used.

The pharmacy device 102 may include a pack out materials and configuration subsystem 202. The pack out materials and configuration subsystem 202 may enable a most desirable shipping configuration, and/or various shipping configurations, to be determined for providing temperature controlled shipping of a temperature sensitive drug from a pharmacy to a recipient such as an individual requesting a fill of a prescription for a temperature sensitive drug.

Figure 3:
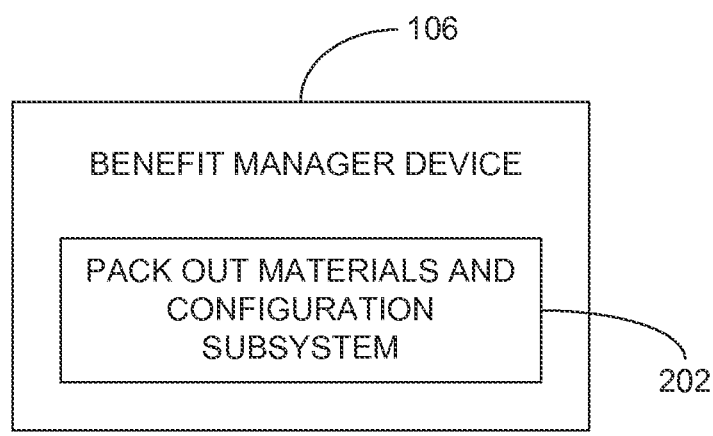
FIG. 3 is a block diagram of an example benefit manager device that may be deployed within the system of FIG. 1, according to an example embodiment.

FIG. 3 illustrates the benefit manager device 106, according to an example embodiment. The benefit manager device 106 may be used by a device operator to determine a desired shipment configuration for a temperature sensitive drug. The benefit manager device 106 may be deployed in the system 100, or may otherwise be used. The benefit manager device 106 may include a pack out materials and configuration subsystem 202. The pack out materials and configuration subsystem 202 may enable a most desirable shipping configuration, and/or various shipping configurations, to be determined for providing temperature controlled shipping of a temperature sensitive drug from a pharmacy to a recipient such as an individual requesting a fill of a prescription for a temperature sensitive drug.

Figure 4:
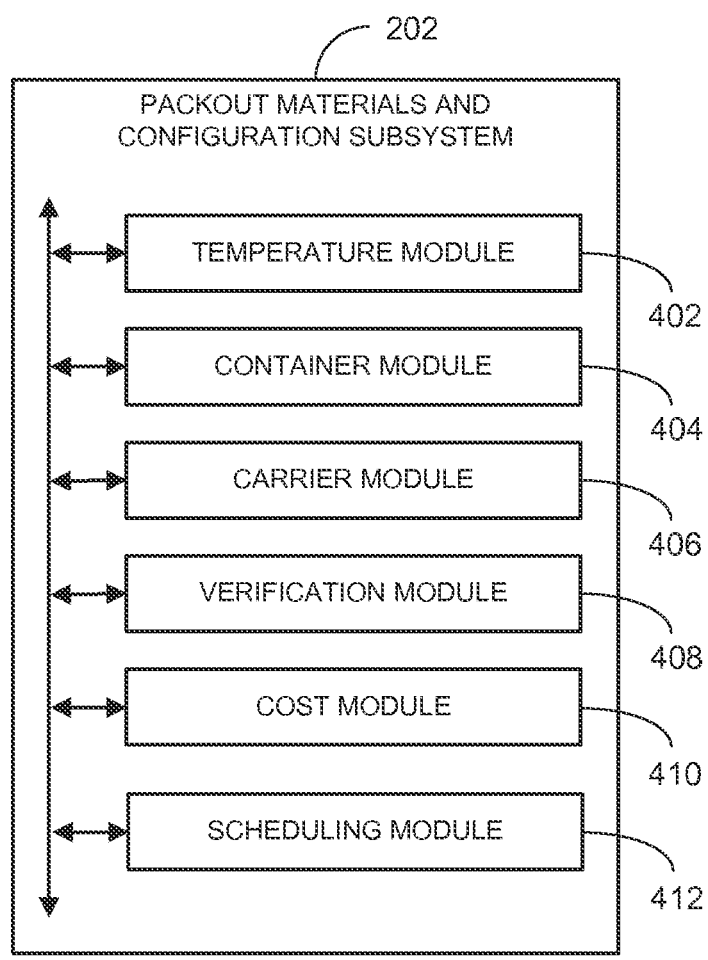
FIG. 4 is a block diagram of an example pack out materials and configuration subsystem that may be deployed within the pharmacy device of FIG. 2 or the benefit manager device of FIG. 3, according to an example embodiment.

FIG. 4 illustrates an example packout materials and configuration subsystem 202 that may be deployed in the pharmacy device 102, the benefit manager device 106, or otherwise deployed in another system. One or more modules are communicatively coupled and included in the packout materials and configuration module 202 to enable packaging of a prescription drug in a shipping container. The modules of the packout materials and configuration module 202 that may be included are a temperature module 402, a container module 404, a carrier module 406, a verification module 408, a cost module 410, and/or a scheduling module 412. Other modules may also be included.

In some embodiments, the modules of the packout materials and configuration module 202 may be distributed so that some of the modules are deployed in the pharmacy device 102 and some modules are deployed in the benefit manager device 106. In one embodiment, the modules are deployed in memory and executed by a processor coupled to the memory. The functionality contained within the modules 402-412 may be combined into a lesser number of modules, further divided among a greater number of modules, or redistributed among existing modules. Other configurations including the functionality of the modules 402-412 may be used.

According to an embodiment, the temperature module 402 may identify an allowable shipping temperature for a prescription drug. For example, the drug may include a prescription drug that requires or should be shipped within a temperature controlled environment to maintain the safety and/or efficacy of the drug. That is, in order to maintain the safety and/or efficacy of the drug, the drug may be maintained at a temperature below a defined maximum threshold temperature, may be maintained at a temperature above a defined minimum temperature, and/or may be maintained at a temperature within a defined temperature window. In general, the shipping temperature for the prescription drug may include a temperature and/or temperature range that the temperature sensitive drug may be maintained at and/or within in order to promote the safety and/or efficacy of the drug. In some embodiments, temperature excursions below a defined minimum and/or above a defined maximum may be permitted but may not exceed a defined timeframe. In some embodiments, the shipping temperature for the prescription drug may include a general storage temperature for temperature controlled prescription drugs. For example, many temperature sensitive drugs may be stored within a general "refrigerated" temperature range, such as between about 2° C. and about 8° C. in order to maintain the safety and/or efficacy of the prescription drug. In such an embodiment, the shipping temperature for the prescription drug may be identified as such a general storage temperature.

In some embodiments, identifying the allowable shipping temperature of the prescription drug may include identifying a storage temperature range specific to the prescription drug. For example, one or more than one temperature sensitive drugs may have a required, preferred, and/or permissible storage temperature that may be different than a general storage temperature for temperature sensitive drugs. The storage temperature specific to the prescription drug may include a higher maximum temperature, a lower maximum temperature, a higher minimum temperature, and/or a lower minimum temperature, which may, for example, give rise to a different preferred, and/or acceptable shipping temperature and/or temperature range (e.g., as may be specified by the drug manufacturer, the FDA, or another entity). In an embodiment, the storage temperature specific to the prescription drug may be identified by accessing the drug data 122 stored within the database 110. In some embodiments, the allowable shipping temperature for more than one temperature sensitive drug may require more than one shipping container to be shipped, that is the more than one temperature sensitive drug to be shipped requires different temperature ranges to maintain drug storage and/or shipping requirements.

The temperature module 402 may also determine forecasted temperature associated with packaging, transportation, delivery, and/or storage until acceptance by the recipient of the shipping prescription drug. For example, the forecasted temperature may include a forecast temperature for a shipping origin and a forecast temperature for a shipping destination. For example, the forecast temperature for the shipping origin may include a forecast temperature for a geographic location of the shipping origin, which may include the geographic location of the pharmacy (e.g., from which the prescription drug may be shipped). Similarly, the forecast temperature for a shipping destination may include a forecast temperature for a geographic location of the shipping destination, which may include the geographic location of the individual who requested the fill of the prescription (e.g., the individual to whom the prescription is being shipped). In an embodiment, determining the forecast temperature for the shipping origin and the forecast temperature for the shipping destination includes accessing weather forecast data 120 for a geographic location of the shipping origin and for a geographic location of the shipping destination. As noted above, the weather forecast data 120 may be continuously and/or intermittently updated. Further, the accessed weather forecast data 120 may include weather forecast data 120 for the days and/or times during which the temperature controlled prescription is to be shipped. As such, the determined forecast temperature for the shipping origin and the forecast temperature for the shipping destination may be indicative of external temperatures that may be experienced by the shipment of the temperature sensitive drugs during the shipping process.

In some embodiments, the temperature forecast for points along the expected or scheduled travel route may be determined and utilized by the temperature module 402. Other temperature forecast data may be used. In some embodiments, the temperature module 402 accesses temperature model data 118 associated with the shipping container.

By way of example, the temperature module 402 identifies a shipping temperature for a prescription drug. The temperature module 402 determines forecasted temperature, such as an origin forecasted temperature for a shipping origin of the prescription drug and a destination forecasted temperature, for a shipping destination of the prescription drug.

The container module 404 associates a shipping container with the prescription drug to ship the prescription drug to the shipping destination. The shipping container may be a cooler, regular packaging without cooling materials, or otherwise. In some embodiments, the type of shipping container associated with the prescription drug may be based on seasons, shipping mode, forecasted temperature, or the like.

In some embodiments, the container module 404 may associate a shipping container with a prescription drug to ship the prescription drug to a shipping destination. The container module 404 may select a shipping configuration for the shipping container including one or more than one phase change unit and the prescription drug.

In a situation in which the prescription that the customer seeks to have filled is a temperature sensitive drug, the container module 404 may determine a shipping configuration (e.g., selection of cooler, selection of frozen and/or liquefied gel packs, selection of void filling materials such as air pillows, bubble wrap, and/or crate paper, and/or configuration of the aforementioned items and including the drug and/or required paperwork) for the drug to allow it to be delivered to the individual seeking the prescription while maintaining the drug within a desired temperature range from the time of packing of the drug at the pharmacy, through shipping of the drug to the individual, and up to delivery of and/or receipt of the drug by the customer seeking to have the drug (e.g., through a prescription fill or otherwise). In some embodiments, the configuration of the items within the shipping container may be a variable (e.g., more than one configuration may exist, and may change with external predicted forecast temperature, or other variables). In an embodiment, the container module 404 may allow different shipping configurations for the temperature sensitive drug to be compared, and may allow a most preferred shipping configuration to be selected. In an embodiment, the preferred shipping configuration may include a lowest cost shipping configuration.

In some embodiments, the container module 404 determines multiple potential packing configurations capable of maintaining the shipping temperature between the shipping origin and the shipping destination.

The carrier module 406 associates an expected shipment duration associated with delivery of the prescription drug to the shipping destination. The expected shipping duration may be based on a shipping carrier, a shipping mode, allocated porch time (e.g., time after the shipment has been delivered but not yet recovered by the individual to which the shipment was delivered), an expected pickup time of the shipping container by a shipping carrier, and/or an expected delivery time of the shipping container through the shipping carrier.

The verification module 408 determines that the prescription drug is capable of maintaining the shipping temperature between the shipping origin and the shipping destination based on the shipping temperature, the origin forecasted temperature, the destination forecasted temperature, association of the shipping container, the expected shipment duration, and the temperature model data associated with the shipping container.

In some embodiments, the calculation performed by the verification module 408 may be independent of external temperatures. For example, the configuration without use of external temperatures may be used to save processing power or reduce computation time.

In some embodiments, the verification module 408 may add additional shipping time to shipping modes (e.g., allotting three days for delivery for a two-day delivery) to account for known shipping delays or otherwise.

In some embodiments, the cost module 410 calculates a cost to ship the prescription drug with the shipping carrier through the shipping mode.

In some embodiments, the temperature module 402 accesses a safety factor associated with the shipping carrier and shipping mode. The verification module 408 may then determine that the prescription drug is capable of maintaining the shipping temperature between the shipping origin and the shipping destination further based on the safety factor.

In some embodiments, the safety factor may be based upon experimentally derived data to account for the variances between forecast temperature data and shipping temperature data (e.g., the temperature of the outside of the package while subject to transit on a truck or airplane).

In some embodiments, the temperature module 402 identifies a forecast temperature offset associated with the origin forecasted temperature and the destination forecasted temperature. The verification module 408 may then determine that the prescription drug is capable of maintaining the shipping temperature between the shipping origin and the shipping destination further based on the forecast temperature offset.

When refrigeration of the packed shipping container is available, either upon packaging (e.g., while in a pharmacy distribution location), during transit (e.g., on a vehicle operated by the shipping carrier), and/or on delivery (e.g., a refrigeration unit at a delivery location), the availability of refrigeration may be used by the verification module 408 in determining or computing whether the shipping container should maintain the prescription drug within the appropriate temperature range. In some embodiments, the carrier module 406 determines refrigeration availability of whether refrigeration of the shipping container is available before transit by the shipping carrier, during shipment by the shipping carrier, or both before transit by the shipping carrier and during shipment by the shipping carrier. In some embodiments, the availability of refrigeration upon packaging may enable more available times for packing prescription drug orders (e.g., during the evening after last shipment, on weekends, or the like).

The verification module 408 may then determine that the prescription drug is capable of maintaining the shipping temperature between the shipping origin and the shipping destination further based on a determination of the refrigeration availability.

In some embodiments, a shipping configuration of the shipping container includes multiple phase change units. In some embodiments, the verification module 408 may verify that the included phase change units are retainable in a shipping container with the prescription drug.

The cost module 410 calculates a shipping cost for each of the potential packing configurations. In some embodiments, the cost module 410 determines a lowest cost of the packing configurations and selects the lowest cost of the packing configurations as a preferred shipping configuration.

In some embodiments, the cost module 410 determines that the cost to ship the prescription drug by one particular shipping container is less than one or more than one other shipping containers. The container module 404 may then select the shipping container to ship the prescription drug based on a cost determination made by the cost module 410.

In some embodiments, the scheduling module 412 when deployed in the packout materials and configuration subsystem 202, may enable scheduling an order with patient. In some embodiments, the scheduling module 412 may schedule a prescription drug order with the patient and then determine a timing of when to pack the order to enable the patient to receive the order when expected in a cost effective manner. In some embodiments, the scheduling module 412 may schedule a prescription drug order with the patient for a date that the cheapest packout will arrive (e.g., by calculating cost and then scheduling the prescription order with the patient). In some embodiments, the order may be packed early after scheduling with patient and the scheduling module 412 program may direct the shipping container to be stored in refrigeration until the pickup time of the cheapest shipping method.

Figure 5:
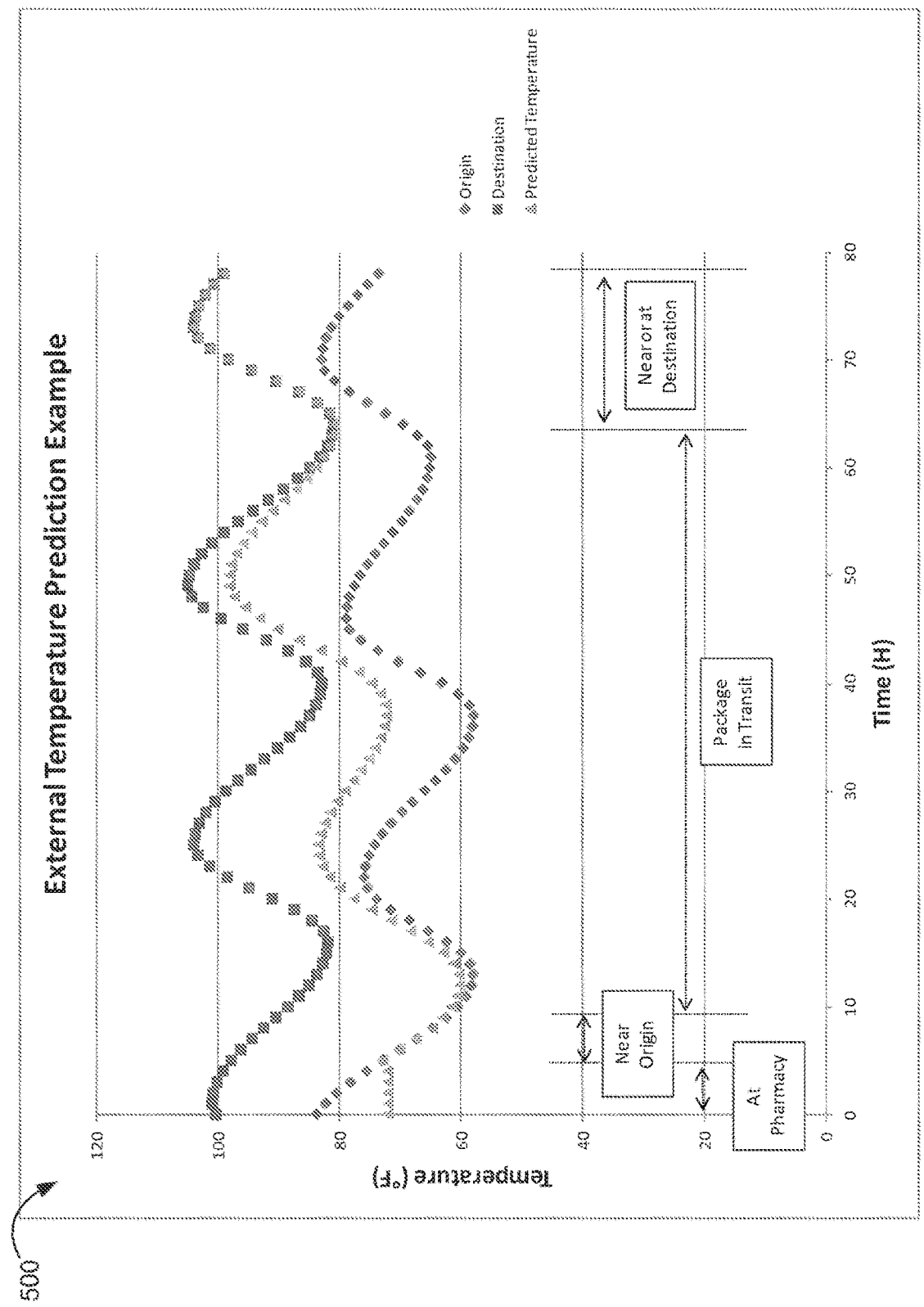
FIG. 5 is a graph of an external temperature prediction for an illustrative example of a shipping origin and a shipping destination, according to an example embodiment.

Referring to FIG. 5, the temperature module 402 may represent forecast temperatures for the shipping origin and forecast temperatures for the shipping destination to ship a prescription drug through mail order as plots 500 of respective functions of temperature over time. In some embodiments, the respective functions may be based upon, at least in part, forecast daily high temperatures and forecast daily low temperatures for each location during the relevant expected shipping time period. A mathematical function may be used to predict more granular forecast temperatures for each location, for example a cosine-based function. In some embodiments, the respective cosine functions may be based upon, at least in part, forecast hourly temperatures for each location during the relevant expected shipping time period. In general, the cosine function may be used to convert daily data to hourly estimations. The cosine based hourly estimations may closely match the forecasted hourly temperatures most of the time.

In such embodiments, the temperature module 402 may determine an external forecast predicted temperature (e.g., predicted temperature) based upon a time period at the pharmacy location (e.g., at pharmacy), a time period near the origin location (e.g., near origin), a time period near the destination location (e.g., near or at destination), and an incremental transition time period there between (e.g., package in transit). Each of these time periods may fluctuate in length and/or predicted temperatures based on the shipping mode (e.g., shipping duration and/or type of shipment such as ground, air, or the like and forecast temperatures of the origin, destination, and/or intermediary locations. Some embodiments may additionally include a time period in refrigerated storage as at least a portion of the external forecast predicted temperature (e.g., in a refrigerator within the pharmacy for storage until pickup and/or in a refrigerated truck). In some embodiments, these time periods are based largely on the shipping mode (e.g., based on the next pickup time for a specific shipping carrier) and/or the time and date of packing. For example, an order may be packed significantly before the next pickup time for a selected shipping service, and in this case, the time period at the pharmacy location may be significantly longer than shown in FIG. 5 and/or consist of at least a portion of this time in refrigerated temperatures. Other representations and determinations of an external forecast predicted temperature profile that may be experienced by the shipment of the temperature sensitive drugs during the shipping process may equally be utilized, for example a lesser or greater number of forecast temperatures or locations or other methods of handling transition time periods (e.g., remain at the origin temperature until the package in transit is approximately half way to the next forecast temperature location, etc.).

The container module 404 may also determine one or more than one potential packing configurations capable of achieving the shipping temperature between the shipping origin and the shipping destination over the shipment duration for a specific shipping mode. In general, the one or more than one potential packing configurations may include one or more than one cooler size and phase change unit quantity combinations. For example, in order to maintain a temperature of the temperature controlled prescription drug that is different than an ambient temperature of the shipping package, an insulated cooler may be utilized as the shipping package. Various different sizes of coolers may be available for shipping the temperature sensitive drug. Further, in order to maintain a temperature of the temperature sensitive drug that is different than the ambient temperature during shipping, the interior temperature of the cooler may be controlled through the use of phase change units. In some embodiments, the phase change units may include a frozen gel pack, such as in the form of a sealed plastic bag or container having a frozen fluid, such as water, contained within the plastic bag or container. For ambient temperatures above the freezing point of the frozen gel pack, the frozen gel pack may reduce the temperature within the cooler (e.g., by absorbing energy during melting of the frozen gel). In some embodiments, the phase change units may include a liquefied gel pack, which may include a sealed plastic bag or container including a liquid, such as water, contained within the plastic bag or container. For ambient temperature below freezing, the liquefied gel pack may prevent decreases in the temperature by release of energy attendant to freezing.

Consistent with the foregoing, the one or more than one potential packing configurations may include one or more than one different cooler sizes having different numbers of frozen gel packs, liquefied gel packs, and/or combinations of frozen gel packs and liquefied gel packs disposed within each cooler. For example, an illustrative packing configuration may include a large size cooler having a single frozen gel pack disposed within the cooler, and another packing configuration may include a large size cooler having two frozen gel packs disposed within the cooler, and another packing configuration may include a medium sized cooler having a single frozen gel pack disposed within the cooler, and yet another packing configuration may include a medium sized cooler having a two frozen gel packs and a single liquefied gel pack disposed within the cooler. Various additional and/or alternative packing configurations may be available. For example, in an illustrative embodiment five different cooler sizes may be available for use in creating different packing configurations. The different cooler sizes may, for example, be capable of holding a different maximum number of frozen gel packs and/or liquefied gel packs. Accordingly, various different combinations of cooler sizes and gel pack combinations may be capable of maintaining the drug within the desired temperature range during shipment, and may, therefore, each be a potential packing configuration.

Figure 6:
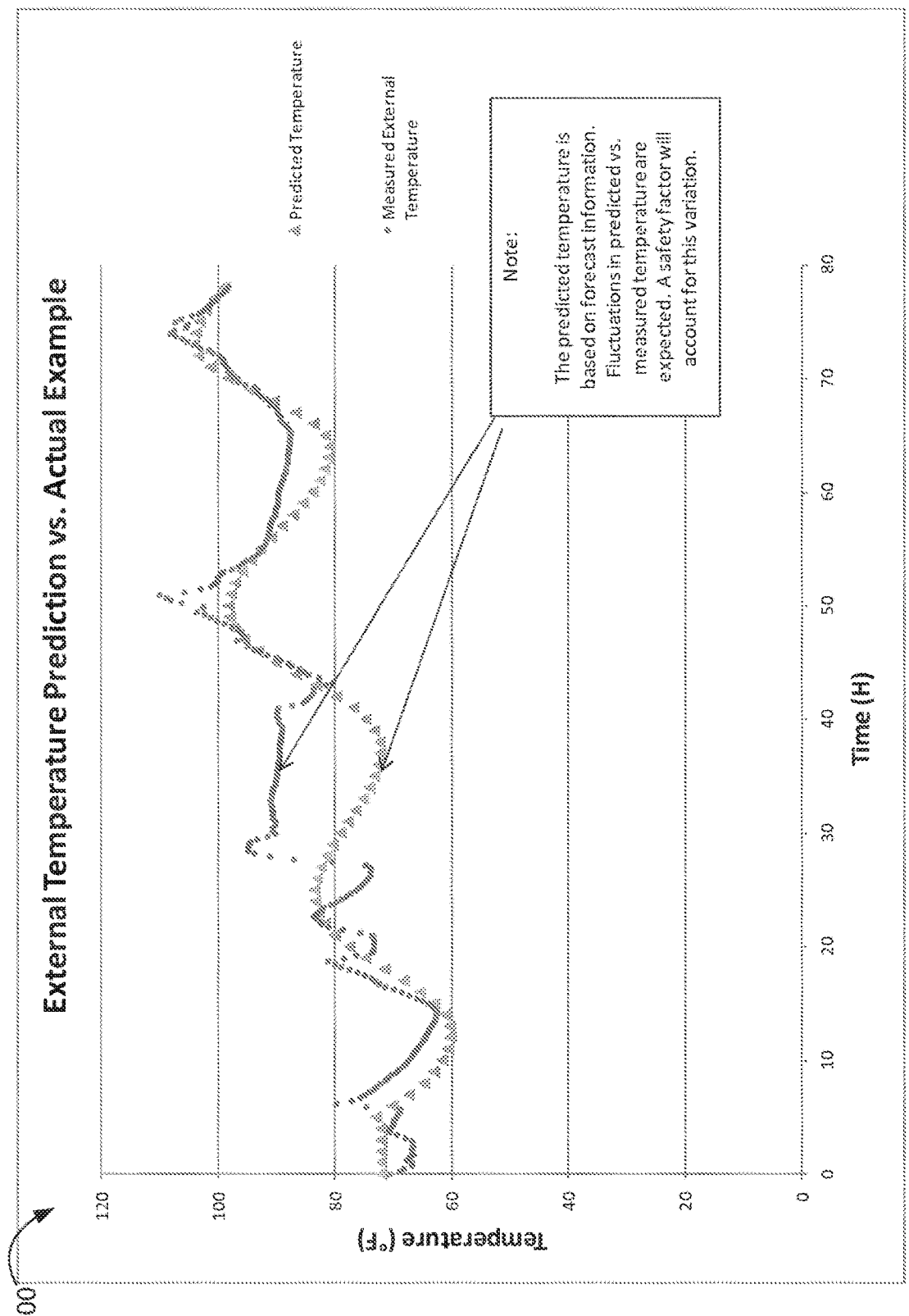
FIG. 6 is a graph depicting predicted temperature versus actual external temperatures, according to an example embodiment.

Referring to FIG. 6, in an embodiment, the external forecast predicted temperature (e.g., predicted temperature) calculated by the forecast temperatures for the shipping origin (e.g., origin) and forecast temperatures for the shipping destination (e.g., destination), also as shown in FIG. 4, is compared with the result of the external measured temperature (e.g., measured temperature). It can be seen from this example that the external forecast predicted temperature and the external measured temperature are not consistently the same at each data point, however there are similarities, and that the average overall temperatures of both the external forecast predicted temperature and the external measured temperature are predictable within a given range. In this embodiment, considering this example as a single data point (e.g., one shipment), a wide range of shipping data may be used by the pack out materials and configuration subsystem 202 to determine a safety factor utilized to overcome the fluctuations between the predicted and measured external shipment temperature data, such that the shipping temperature within the cooler is maintained for the entire shipping duration, even in situations when the forecasted temperature was not an accurate determinant of the external shipping temperature. The verification module 408 may address the safety factor to be utilized in shipping due to the disparity between the external forecast predicted temperature and the external measured temperature. In an embodiment, the wide range of shipping data may be taken in one or more than one season, and may consist of shipments of one or more than one shipping mode (e.g., air, ground, or the like), transport type (e.g., 1 day, 2 day, 3 day, or the like) and/or shipping carrier, and the to-be-utilized safety factor may be dependent on one or more than one of these characteristics. In some embodiments, the safety factor may be created by using a more severe temperature offset (e.g., temperature further from 32° F.) from the external forecast predicted temperature and may be used in the prediction of internal cooler temperature or product temperature by the temperature model data 118. In other embodiments, the safety factor may be determined by the verification module 408 by using a temperature offset (e.g., temperature adjustment) from the external forecast predicted temperature and may be used in the prediction of internal cooler temperature or product temperature by the temperature model data 118. The safety factor determined by the temperature adjustment, whether a more severe adjustment or an offset, may be dependent on the external forecast predicted temperature. At each external forecast predicted temperature, a different temperature adjustment may be utilized for safety. For example, when the external forecast predicted temperature is 50° F., a greater temperature adjustment may be utilized than in warmer weather, as the external forecast predicted temperature may generally be colder than the measured shipping data at this temperature, although the reverse may also be true. In some embodiments, the temperature adjustment is designed such that a minimal amount of shipments will experience a more severe external temperature. In this way, the gel pack(s) may adequately sustain the shipping temperature of the container(s) of drug with minimal defects (e.g., out of the shipping temperature range prior to receipt of the drug(s) by the patient). In one embodiment, the safety factor may be considered as part of the external forecast predicted temperature, which may be modified to be more severe than the originally predicted external forecast predicted temperature. In another embodiment, the safety factor may be considered as part of the container data 114 and/or the ice data 116. For example, the cooler size, wall thickness, and/or thermal coefficient may be adjusted such that the container module 404 predicts the cooler would take the shipping temperature of the drug out of the acceptable shipping temperature range sooner than it actually would when experiencing the external forecast predicted temperature. In other embodiments, other methods of determining safety or computing a safety factor may be performed, for example, using a most severe predicted temperature as a static temperature for the external temperature over the entire shipment, using a most severe location between the origin and destination predicted temperatures as the temperature for the external temperature over the entire shipment, through creation of a temperature modeling algorithm that is safe for all circumstances (e.g., safe by prediction that the shipping temperature of the drug will not last as long as it does in reality), etc. In some embodiments, a combination of safety factors may be utilized to achieve the desired safety.

The verification module 408 may determine a given potential packing configuration as being capable of maintaining the shipping temperature (e.g., maintaining an interior temperature of the cooler below a maximum storage temperature for the prescription drug, within a storage temperature range for the prescription drug, and/or above a minimum storage temperature for the prescription drug) for an available shipping duration. The available shipping duration may include a duration of time during which it may be possible to transport the shipment of the temperature controlled prescription drug to the member utilizing a shipping carrier (e.g., such as a parcel carrier, or the like). In an embodiment, determining the one or more than one potential packing configurations capable of achieving the shipping temperature may be based upon, at least in part, temperature model data 118 associated with one or more than one cooler size and quantities and/or combinations of phase change units. For example the temperature model data 118 may be accessed from the database 110. The temperature model data 118 may be based upon, at least in part, experimental evaluations of internal cooler temperature over time for different packing configurations. For example, and referring to FIG. 7, a graph of temperature over time 700 is shown for an arbitrarily chosen packing configuration. As shown, the packing configuration was evaluated for the time it took for the internal temperature of the cooler to rise to 46.4° F. (8° C., the general upper limit for temperature sensitive drug storage temperatures), for a given external temperature of the cooler depicted in FIG. 5 and FIG. 6. In the specific illustrated arbitrary example, it can be seen that the measured internal temperature (e.g., internal temperature given measured external) rose to 46.4° F. sooner than the predicted temperature (e.g., predicted frozen gel temperature without safety factor) because, as shown in FIG. 6, the measured external temperature (e.g., measured external temperature) was more severe (e.g., on average above the temperature of the predicted external forecast temperature (e.g., predicted temperature)) than the predicted external forecast temperature (e.g., predicted temperature). Additionally notice that when a safety factor is considered, that the predicted frozen gel temperature (e.g., predicted frozen gel temperature with safety factor) rose to 46.4° F. sooner than the measured internal temperature (e.g., internal temperature given measured external). Because the safety factor used in this example was a more severe temperature offset than the actual temperature the package experienced during the shipment, the drug would be transported safely (e.g., within the temperature parameters specified for the drug being transported). In the specific illustrated example of FIG. 7, the drug being transported having an upper temperature limit of 46.4° F. would be safe for transport durations up to 65 hours when using this particular packout configuration. In some embodiments, this arbitrary configuration of frozen gel packs and cooler would be considered as a potential packing configuration for shipping a drug that must be maintained below 46.4° F. by pack out materials and configuration subsystem 202, and then rejected for the example 78 hour transport time on the grounds that the 46.4° F. limit is breached at hour 65 by the predicted temperature (e.g., predicted frozen gel temperature with safety factor). This configuration would not safely be used for this predicted temperature profile.

Figure 7:
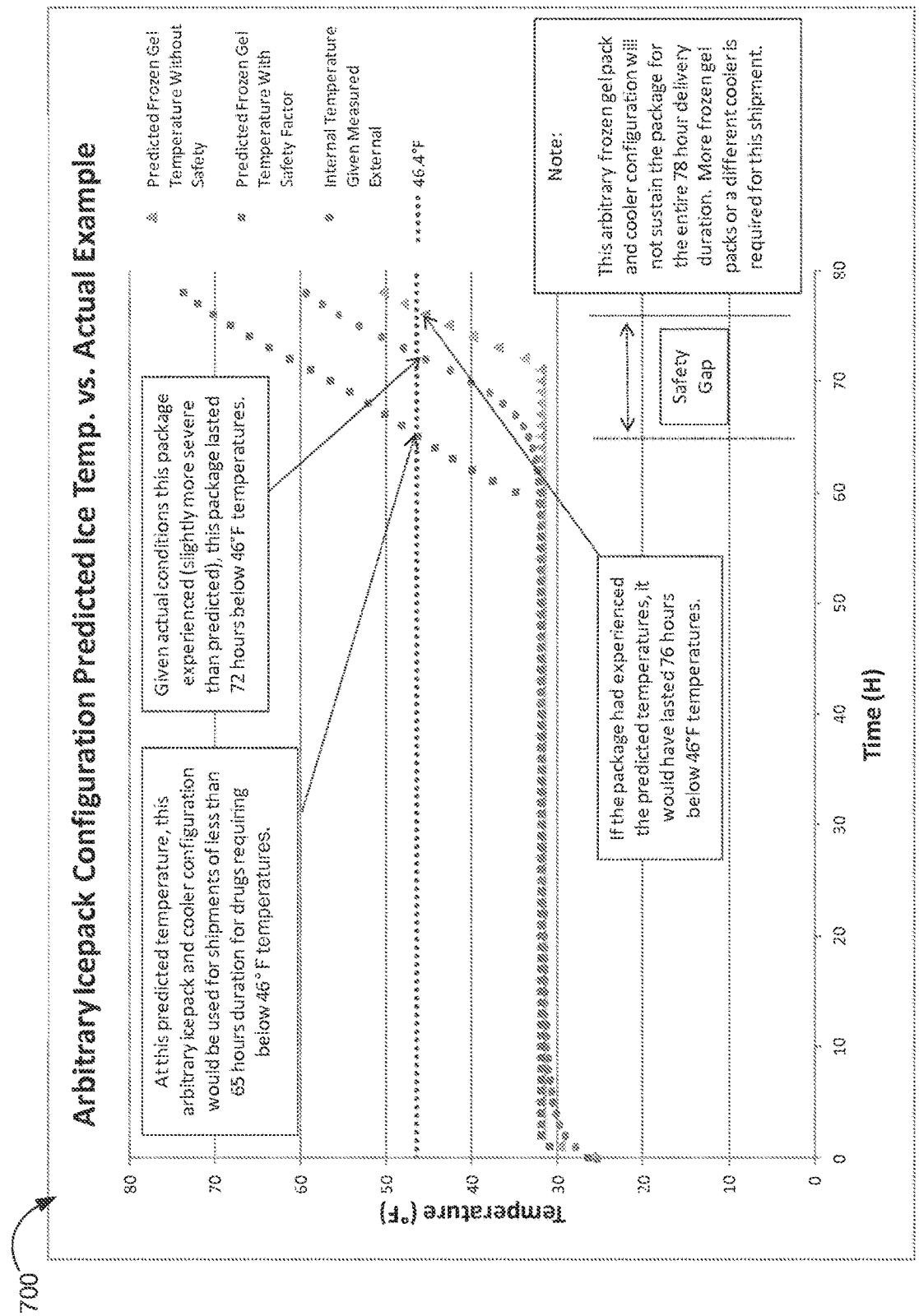
FIG. 7 is a graph of predicted and actual internal ice temperatures for an arbitrary ice pack and cooler configuration, according to an example embodiment.

The verification module 408 may use this configuration safely for other shipping scenarios, for example in a scenario yielding the same external forecast predicted temperature pattern and an overall shipping durations of less than 65 hours. For less severe external forecast predicted temperatures this configuration may be additionally safely utilized for shipping durations equal to or exceeding 65 hours. For the shipment duration and temperature profile depicted in FIG. 5 and FIG. 6, either one or more additional frozen gel pack(s), a smaller cooler, a cooler having thicker walls and/or a cooler having higher thermal insulation properties would be required to sustain the shipment for a drug with a 46.4° F. temperature requirement. The container module 404 may determine these potential packing configurations. In some embodiments, the temperature model data 118 may include experimental data for each potential packing configuration, and a variety of external temperatures, to thereby provide time and internal cooler temperatures for the potential packing configurations. In some embodiments, the temperature model data 118 may be extrapolated to provide performance predictions for packing configurations under conditions that may not have been specifically experimentally evaluated (e.g., for forecast temperatures and/or gel pack configurations that may not have been experimentally evaluated). Referring also to FIG. 7, in some embodiments, the experimental data may include data based on plot 600 or may include multiple predictive models. In some embodiments, the temperature model data 118 may be implemented as experimentally derived or modified equations that may be used to calculate predicted performance for different packing configurations.

In some embodiments, the shipping mode may, at least in part, determine the length of shipment, and therefore the shipping profile for the delivery of the temperature sensitive drugs given the origin and destination of the shipment. For example, the external forecast predicted temperature as shown in FIG. 5 (e.g., predicted temperature) may vary with shipping mode, pickup time/date, and length of time until delivery and/or delivery time. The transition period may be different depending on the specific shipping mode. Further, based on this external temperature prediction, and based on the safety factor associated with this prediction, the gel pack quantity and/or configuration that may be required for the shipping mode being evaluated may be determined for each cooler size. Additionally, it may be determined if the temperature sensitive drug and the required gel pack(s) for a given shipping mode will fit within a selected cooler. For example if three cooler sizes are available and there are eight possible shipping modes, there may be 24 potential shipping options. However, some of the options may not be viable, for example, because required gel packs may not fit in the cooler with the temperature sensitive drug (e.g., a small cooler may not be capable of holding ten gel packs with, or without the one or more than one container(s) of temperature sensitive drugs). Accordingly, such non-viable shipping options may be eliminated.

In some embodiments, the container module 404 may perform detailed mathematical calculations to estimate the internal cooler temperature or product (e.g., container(s) of drug) temperature during shipment of the drug(s) to the member. A specific shipping mode and cooler configuration may be chosen for evaluation. Various combinations of shipping mode(s) and cooler(s) may be evaluated separately. The shipping duration of the shipping mode is known, and the forecast predicted external temperature of the cooler is predicted from the time of packing the container(s) of drug in the cooler until an expected worst case time that the member who ordered the medication will receive it. The forecast predicted external temperature, as shown in FIG. 5, may be based on one or more than one at pharmacy temperature, refrigeration temperature (not shown), near origin temperature, in transit temperature, and/or near or at destination temperature. The duration of each temperature may be a variable based upon one or more than one time the container(s) of drug is packed, the next carrier and mode specific pickup time, the expected length of the shipment, and/or the expected delivery time/date. For example, the container(s) of drug may be packed on a weekend and the next carrier and mode specific pickup time may not occur until the following Monday. Given the forecasted temperature array defined by the external forecast predicted temperature, a temperature offset may be applied to each data point for safety. The temperature offset may be specific to each data point, a consistent offset for all data points, or a consistent offset for some of the data points. The temperature offsets may be determined based on collected data at a range of varying external forecast predicted temperatures, in a variety of seasons (e.g., winter, spring, summer, fall), and/or to a variety of destinations (e.g., at locations throughout the continental United States of America, Canada, or other geographic locations). The temperature array containing the forecasted temperatures and applied safety offset may be used by the verification module 408 to determine the gel pack configuration specific to the selected cooler and shipping mode. The pack out materials and configuration subsystem 202 may perform mathematical calculations based on the cooler properties, a gel pack configuration and the temperature array. The internal gel temperature of a specific gel pack configuration can be calculated through heat transfer and thermodynamic equations. Heat transfer through a surface over time can be defined by the formula $Q=K*A*dT/dX$, where K is the thermal coefficient of heat transfer, A is the surface area of the barrier, dT/dX is the temperature differential by position in the material, and Q is the rate of heat transfer through the material of wall thickness X. In this example, the barrier may be the walls of the cooler. Conservation of energy within a closed system with no net work, no change in kinetic energy, and no change in height may be defined by $Q_{net}=m(U_2-U_1)+m*h_{i,f}$, where m is the weight of the substance, $U_2$ is the internal energy of the material at the end of a time period, $U_1$ is the internal energy of the substance at the beginning of the time period, $h_{i,f}$ is the latent heat of fusion of the substance, and $Q_{net}$ is the heat absorbed by the substance over the time period. In this example, the substance may be the gel pack(s). The heat transfer through a surface over time and conservation of energy within a closed system equations are joined to determine the internal temperature at the end of a time period, given the cooler properties, gel pack properties, and beginning temperature. The initial internal temperature may be based on other thermodynamic equations of a closed system relating the air temperature, drug temperature, frozen gel pack temperature, liquefied gel pack temperature, and/or the temperature of other packaging materials (e.g., air pillows, paperwork, or the like). For example the time period that a new internal temperature will be computed may be one hour. More or less time periods may be computed. The resultant of the calculations may be the internal temperature over time profile for each hour, in this example. Through testing, cooler properties or gel pack properties may be changed to achieve a consistent internal cooler temperature, gel pack temperature, or product temperature that matches the experimental testing given the known external temperature. Using an accurate or conservative internal temperature model given an actual external temperature, and given a specific gel pack configuration and forecast temperature array with safety, a failure (e.g., temperature exceeding the shipping temperature or temperature range of the container(s) of drug) time can be determined. If the failure time does not exceed the required time period given the shipping mode, another configuration of gel pack(s) may be calculated using the same methods, until a calculated configuration holds the shipping temperature for the entire duration of the temperature array. Gel pack configurations tested may consist of an increasing number of packs, but may also consist of random or other ordered test configurations. More than one gel pack size may be used, and gel pack(s) existing as frozen gel pack(s), liquefied gel pack(s) or a combination of both frozen and liquefied gel pack(s) may be utilized as a particular configuration being tested. The minimum weight of gel pack(s) capable of sustaining the required time period of the shipping mode given the entire temperature array with safety will be stored as the arbitrary combination of gel packs and cooler size. In other embodiments, other weights of gel pack(s) capable of sustaining the required time period of the shipping mode will be chosen and stored as the arbitrary combination of gel packs and cooler size. More than one arbitrary configuration per cooler size may also be stored. Gel pack configurations and container(s) of drug may exceed the internal volume of a given cooler. In this example, the configuration of gel pack(s), cooler size, and shipping mode may be eliminated from the results. In other embodiments, the volume of the configuration of gel pack(s) and container(s) of drug is tested against the internal cooler volume prior to the mathematical computations conducted by the container module 404, and if the materials will not fit inside of the cooler, the mathematical computations to determine the internal cooler temperature, gel pack temperature, or product temperature may not be performed. The results of each stored arbitrary configuration of gel pack(s), cooler size, and shipping mode capable of maintaining the shipping temperature or shipping temperature range for the duration of the shipping mode are compared. A total cost for each configuration of gel pack(s), cooler size, and shipping mode are computed, and the lowest cost configuration may be selected. The other available results may be stored and may be used in the case that the packer cannot fit all of the required items into the cooler.

Continuing with the foregoing, various techniques may be utilized for determining if the container of temperature sensitive drugs and the required gel packs will fit within a given cooler size. If the container of temperature sensitive drugs and required gel packs will not fit within a given cooler, the shipping duration may be decreased (e.g., by using a lower time duration shipping service), so that fewer gel packs may be required to maintain the necessary interior temperature for the shipping duration. In some embodiments, the size of the cooler may be increased to accommodate the gel packs the larger cooler requires for a given shipping mode. A variety of such techniques may include cubing, which may consider the dimensions of the container(s) of temperature sensitive drug and the dimensions of the gel pack(s) and determining if the required gel pack(s) and the container(s) of temperature sensitive drug can fit within a given cooler. One cubing technique, which may generally be referred to as full cubing, considers a situation in which all containers of temperature sensitive drugs are grouped together within the cooler, and the gel packs are placed proximal the containers of temperature sensitive drugs. Consistent with such a technique, gel packs and containers of temperature sensitive drugs may not be randomly organized within the cooler. It may be determined if the gel packs and containers of temperature sensitive drug grouped in such a manner will fit within a given cooler based on best fit orientation of containers and gel packs. Another cubing technique, generally referred to as volume based cubing, may consider whether the volume of each gel pack and the volume of each container of temperature sensitive drug to be included within the cooler, is less than the internal volume of the cooler. In some embodiments, volume based cubing may require an additional margin of cooler volume for determining that the gel packs and containers of temperature sensitive drugs will fit within the cooler, due to differing sizes and shapes of the gel pack(s) and container(s) of temperature sensitive drug.

The cost module 410 may calculate a shipping cost for each of the one or more than one potential packing configurations. For example, calculating a shipping cost for each of the one or more than one potential packing configurations may be based upon, at least in part, shipping configuration characteristics and the shipping data 112 including shipping mode pricing for one or more than one shipping carriers. The shipping configuration characteristics may include one or more than one shipping configuration weight, a shipping configuration size, or combinations thereof. The shipping configuration characteristics may be retrieved at least partially from the container data 114 (e.g., the cooler size/cooler weight/shipping mode specific dimensional volume specifications), the ice data 116 (e.g., the frozen gel pack weight) and the drug data 122 (e.g., the drug weight). For example, different shipping carriers may charge different shipping rates for shipping packages of different weights and/or different sizes. Further, different shipping carriers may have different shipping rates from one another. In an embodiment, the shipping data 112 may be accessed, and may include shipping rates for different package sizes and/or weights associated with different shipping carriers. In some embodiments, the shipping mode pricing may include pricing for one or more transport type (such as air freight versus ground shipping) and transport duration (e.g., next day shipping, two day shipping, etc.) combinations. Accordingly, shipping rates for different shipping configurations (e.g., which may have different weights depending upon, at least in part, the number of ice packs utilized, the drug weight, and the cooler weight, and may have different physical sizes based upon, at least in part, the size of the cooler utilized in the packing configuration) and different shipping modes (e.g., air transport, ground transport, next day, two day, etc.) may be calculated. Furthermore, some packing configurations may only be suitably shipped via a subset of available shipping modes. For example, as shown in FIG. 6, the arbitrarily chosen pack out including a cooler and a number of frozen gel packs may be predicted to maintain the interior temperature of the cooler at the shipping temperature for 65 hours. As such, shipping modes extending beyond 65 hours may not be utilized for this specific forecasted predicted external temperature profile, as the interior temperature after 65 hours may be above the shipping temperature depending on the actual external conditions experienced by the package during delivery. However, for such a packing configuration, next day or two day shipping may be suitably utilized given the forecasted external conditions.

In some embodiments, the pack out materials and configuration subsystem 202 may determine a lowest cost of the one or more potential packing configurations. For example, based on the calculated shipping costs for the different shipping configurations, a lowest cost shipping configuration may be identified. However, the lowest cost shipping configuration may not be the lowest cost method of delivering the drugs to the patient. In some embodiments, the cost module 410 may identify the lowest cost method of delivering the drugs to the patient by ranking the totals of the calculated shipping costs of the shipping configuration, the cost of the shipping materials (e.g., frozen and/or liquefied gel pack(s), cooler, dunnage, etc) and/or labor considerations (e.g., labor required to place contents including gel packs, product and dunnage into cooler, labor to handle cooler in the pharmacy, etc) for each available cooler size and shipping mode. In some embodiments, some of the cost totals for each available cooler size and shipping mode may not be available, due to cubing considerations. In other embodiments, some of the cost totals for each available cooler size and shipping mode may be eliminated, due to cubing considerations. Further, in some embodiments, the pack out materials and configuration subsystem 202 may select the lowest cost of the one or more potential packing configurations as a preferred shipping configuration. In some embodiments, the preferred shipping configuration may additionally be changed at the time of packing.

In some situations, a cooler may not be required. For example, based upon, at least in part, the forecast predicted external temperatures it may be determined that no cooler is required to maintain the desired temperature of the temperature sensitive drug. For example, some seasonal drugs may require protection from extreme heat and/or extreme cold, but during moderate times of the year may be shipped without the need for additional temperature control. Further, in some situations normally refrigerated drugs may be shipped without the use of a cooler if the forecast predicted external temperature range during shipment is within tolerance of the drug. The forecast predicted temperatures may also account for an excursion range (e.g., the possible variance from the predicted values) and determine if a cooler and gel pack configuration is required. If no cooler and gel pack configuration is required, a shipping configuration may be provided to the packer to pack the temperature sensitive drug normally, for example with a corrugated box.

Drug temperature range storage requirements may affect which phase change materials may be used. For example, gel packs may be a conventionally used material. However, in some cases special materials may be selected. A determination that a special phase change material is to be used may be based upon, at least in part, forecasted external temperatures and/or based upon the drug itself. For example, with a normal gel pack, in a scenario when it is substantially below 32° F., the internal space in the cooler may approximately 32° F., due to the fact that the liquefied gel pack (in the process of freezing) is the warmest part of the cooler and phase changes at 32° F. In such an example, a 2-8° C. drug (e.g., in which the drug spoilage is greatly accelerated if the drug falls below 2° C. for any substantial time period) may require a special phase change material pack out (e.g., which may maintain the internal temperature of the cooler at or above 2° C.). In other examples, a drug may need to be maintained exclusively within a temperature range of between 59-86° F., without falling below 59° F. for any substantial time period. In this case no matter the external temperature a special phase change material may be utilized for maintaining the critical internal cooler temperature (e.g., unless external weather is always between 59-86° F.).

Figure 8:
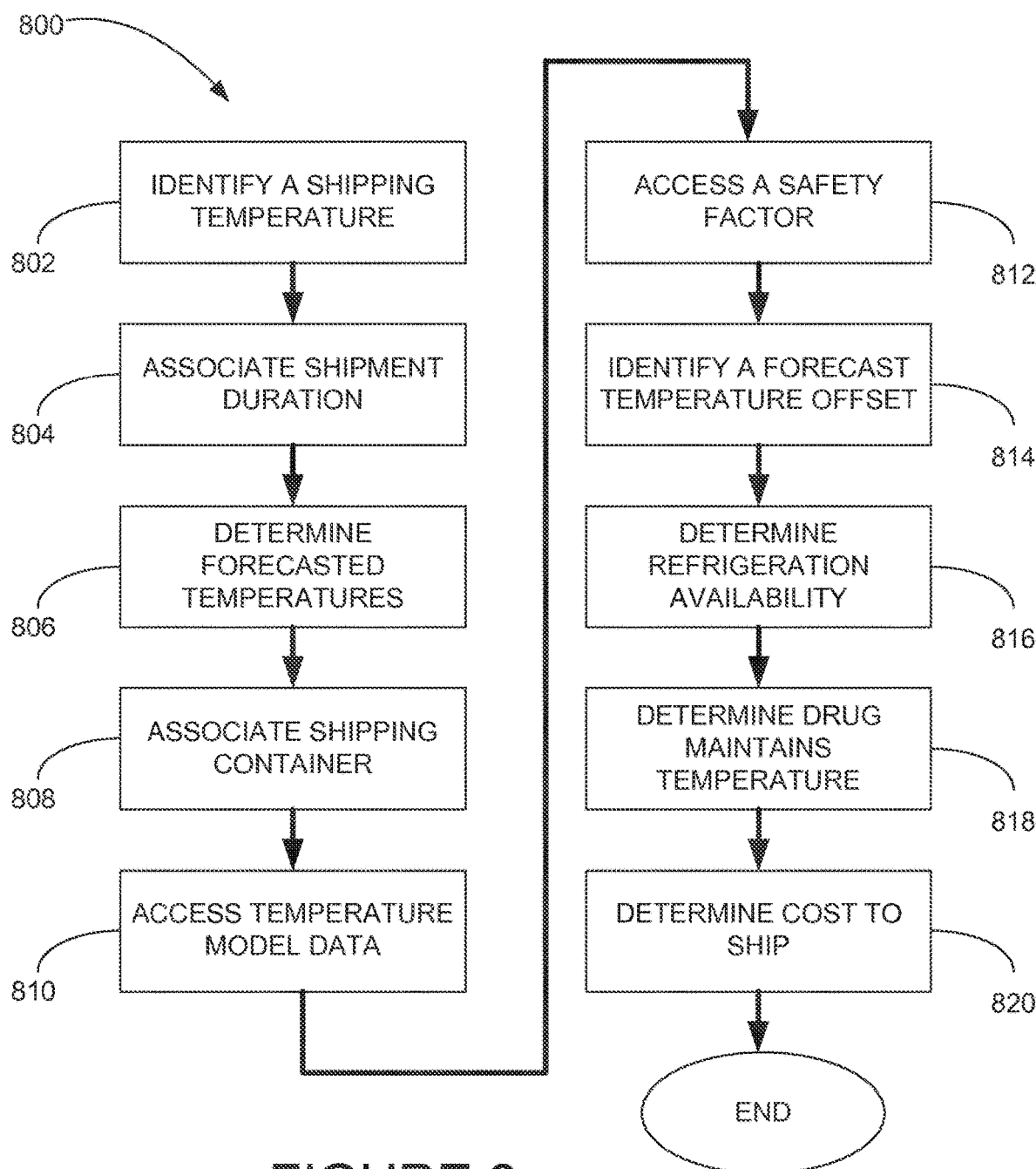
FIGS. 8-10 are process flows illustrating methods for shipping selection, according to example embodiments.

FIG. 8 illustrates a method 800 for shipping selection, according to an example embodiment. The method 800 may be performed by the pharmacy device 102, the benefit manager device 106, the patient device 108, partially by one of the devices 102, 106, 108 and partially by one or more than one of the other devices 102, 106, 108 or may be otherwise performed.

At block 802, a shipping temperature is identified for a prescription drug. The shipping temperature may be stored as part of the drug data 122 or otherwise. Identifying the shipping temperature for the prescription drug may include identifying a general storage temperature for temperature controlled prescription drugs. Identifying the shipping temperature of the prescription drug may include identifying a storage temperature specific to the prescription drug.

An expected shipment duration associated with delivery of the prescription drug to the shipping destination is associated at block 804. The expected shipping duration may be based on a shipping carrier (e.g., FEDEX or UPS) and a shipping mode (e.g., overnight delivery or two-day delivery).

One or more forecasted temperatures may be determined at block 806. For example, an origin forecasted temperature for a shipping origin of the prescription drug and a destination forecasted temperature for a shipping destination of the prescription drug may be determined at block 806. Determining the forecast temperature for the shipping origin and the forecast temperature for the shipping destination may include accessing the weather forecast data 120 for a geographic location of the shipping origin and for a geographic location of the shipping destination.

A shipping container is associated with the prescription drug to ship the prescription drug to the shipping destination at block 808. A single shipping container may be associated with the prescription drug as consideration for shipping the prescription drug, or multiple shipping containers may be associated as consideration for shipping the prescription drug.

In some embodiments, the association of a shipping container includes association of a shipping configuration including multiple phase change units. The operations performed at block 808 may include verifying that the phase change units are retainable in the shipping container with the prescription drug.

In some embodiments, the operations performed during one or more than one of the blocks 802-808 may occur in any order, simultaneously, or otherwise. For example, the destination forecasted temperature may be identified at block 802 based on the shipping duration associated with the delivery at block 804.

The temperature model data 118 associated with the shipping container is accessed at block 810. In some embodiments, the temperature model data 118 accessed at block 810 may be based on the operations performed at one or more than one of the blocks 802-808.

A safety factor associated with the shipping carrier and shipping mode may be accessed at block 812. The safety factor may be stored as part of the ice data 116 or otherwise. A forecast temperature offset associated with the origin forecasted temperature and the destination forecasted temperature may be identified at block 814.

At block 816, a determination of refrigeration availability of whether refrigeration of the shipping container is available before transit by the shipping carrier, during shipment by the shipping carrier, or both before transit by the shipping carrier and during shipment by the shipping carrier may be made.

At block 818, a determination that the prescription drug is capable of maintaining the shipping temperature between the shipping origin and the shipping destination is performed based on the shipping temperature, the origin forecasted temperature, the destination forecasted temperature, association of the shipping container, the expected shipment duration, the temperature model data associated with the shipping container, the safety factor, the forecast temperature offset, and/or a determination of the refrigeration availability. The cost to ship the prescription drug with the shipping carrier through the shipping mode may be determined at block 820.

Figure 9:
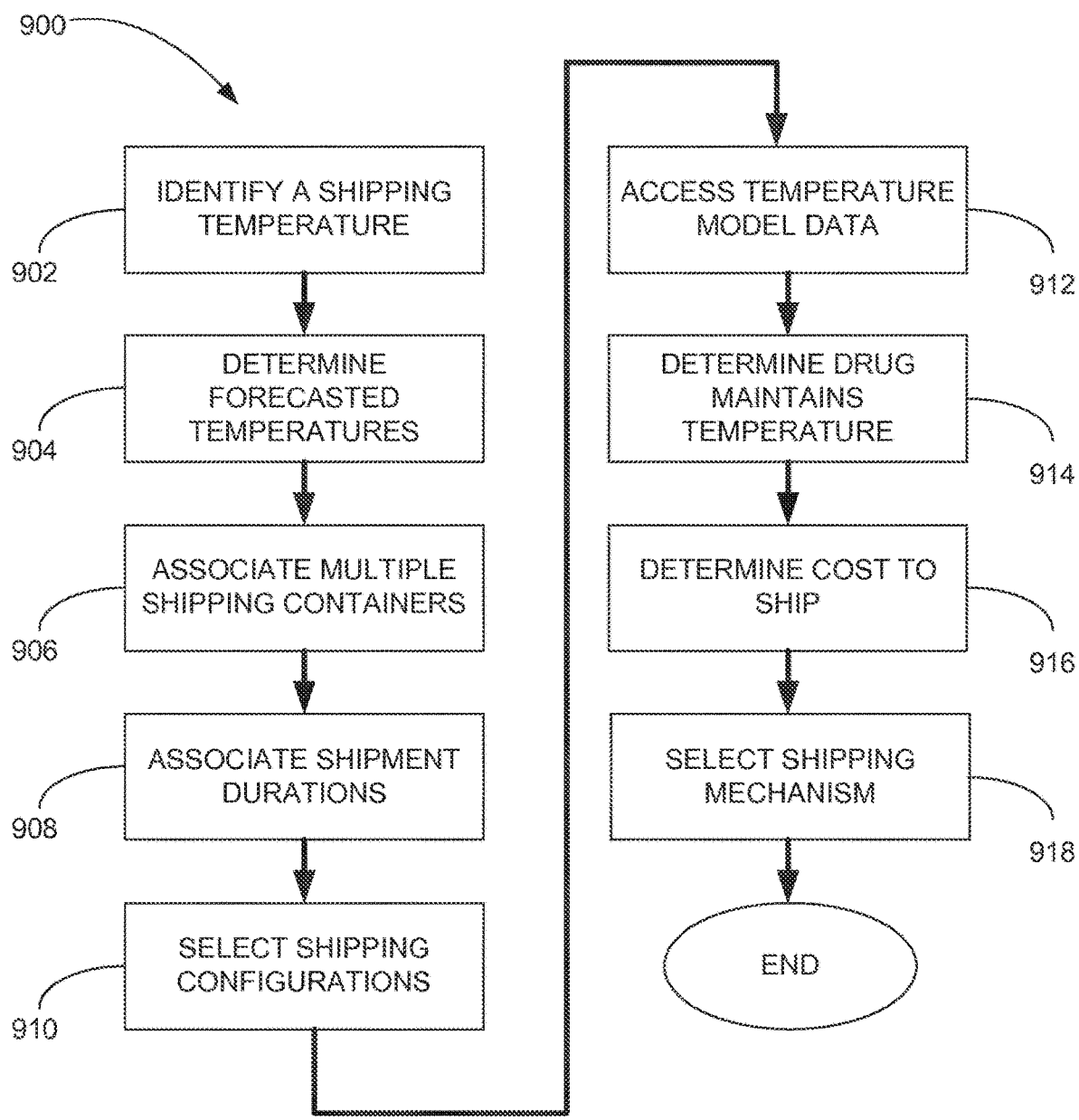

FIG. 9 illustrates a method 900 for shipping selection, according to an example embodiment. The method 900 may be performed by the pharmacy device 102, the benefit manager device 106, the patient device 108, partially by one of the devices 102, 106, 108 and partially by one or more than one of the other devices 102, 106, 108 or may be otherwise performed.

A shipping temperature for a prescription drug is identified at block 902. A determination of an origin forecasted temperature for a shipping origin of the prescription drug and a destination forecasted temperature for a shipping destination of the prescription drug is made at block 904. In some embodiments, forecasted temperature may be obtained for a number of days in advance (e.g., one day, two days, three days, four days, five days, six days, seven days, eight days, nine days, ten days, or more than ten days). In other embodiments, the forecast temperature may be obtained based on the shipping durations associated at block 908.

Multiple shipping containers are associated with the prescription drug to ship the prescription drug to the shipping destination at block 906.

Expected shipment durations are associated with delivery of the prescription drug to the shipping destination at block 908. In some embodiments, each of the expected shipment durations may be based on the associated shipping carrier and the shipping mode.

At block 910, a shipping configuration for each of the shipping containers is selected. Each of the shipping configurations may include one or more than one phase change unit and the prescription drug. In some embodiments, the operations performed at block 910 include verifying that any phase change units are retainable in the shipping container with the prescription drug.

In some embodiments, the operations performed during one or more of the blocks 902-910 may occur in any order, simultaneously, or otherwise.

The temperature model data associated with the multiple shipping containers are accessed at block 912. In some embodiments, the temperature model data 118 accessed at block 912 may be based on the operations performed at one or more of the blocks 902-910.

For the various shipping containers, a determination of that the prescription drug is capable of maintaining the shipping temperature between the shipping origin and the shipping destination within a shipping container and having the shipping configuration based on the shipping temperature, the origin forecasted temperature, the destination forecasted temperature, association of the shipping container, the expected shipment duration, the temperature model data associated with the shipping container, and the shipping configuration of the shipping container is made at block 914.

At block 916, a determination of the cost to ship the prescription drug with the various shipping containers, various shipping carriers, and various shipping modes is determined. A shipping mechanism is selected to ship the prescription drug at block 918 based on the determination of the cost to ship. Typically, the lowest cost shipping mechanism is selected at block 916.

Figure 10:
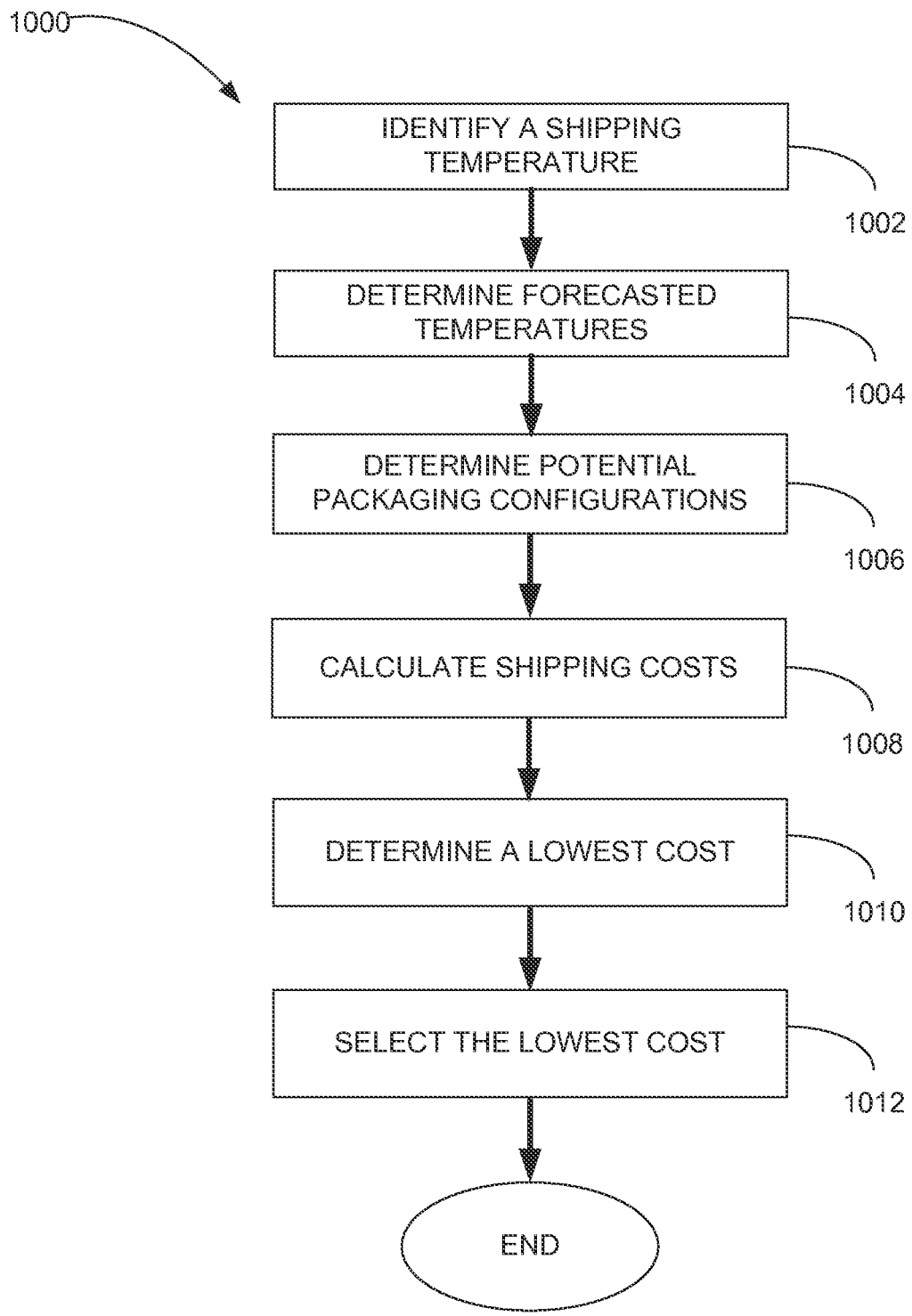

FIG. 10 illustrates a method 1000 for shipping selection, according to an example embodiment. The method 800 may be performed by the pharmacy device 102, the benefit manager device 106, the patient device 108, partially by one of the devices 102, 106, 108 and partially by one or more than one of the other devices 102, 106, 108 or may be otherwise performed.

A shipping temperature is identified for a prescription drug at block 1002.

A determination of an origin forecasted temperature for a shipping origin of the prescription drug and a destination forecasted temperature for a shipping destination of the prescription drug is made at block 1004.

One or more than one potential packing configurations capable of achieving the shipping temperature between the shipping origin and the shipping destination may be determined at block 1006. These potential packing configurations may include one or more than one cooler size and quantities and/or combinations of phase change units. Determining these potential packing configurations capable of achieving the shipping temperature may be based upon, at least in part, temperature model data associated with the cooler size and temperature control unit quantity combination.

A shipping cost for each of the potential packing configurations may be calculated at block 1008. Calculating a shipping cost for each of the potential packing configurations may be based upon, at least in part, shipping configuration characteristics: the shipping data 112, the container data 114, the ice data 116, the drug data 122. The shipping configuration characteristics may include a shipping configuration weight (determined from the shipping data 112, the container data 114, the ice data 116, the drug data 122), a shipping configuration size (determined from the container data 114), or combinations thereof. The shipping mode pricing may include pricing for transport type, transport duration, or combinations thereof. A lowest cost of the potential packing configurations may be determined. The lowest cost of the potential packing configurations may be based on the lowest cost combination of cooler cost, frozen and/or liquefied gel pack(s) cost, shipping charge for the configuration, and/or labor considerations. Further, in some embodiments, the lowest cost of the potential packing configurations may be selected as a preferred shipping configuration.

Figure 11:
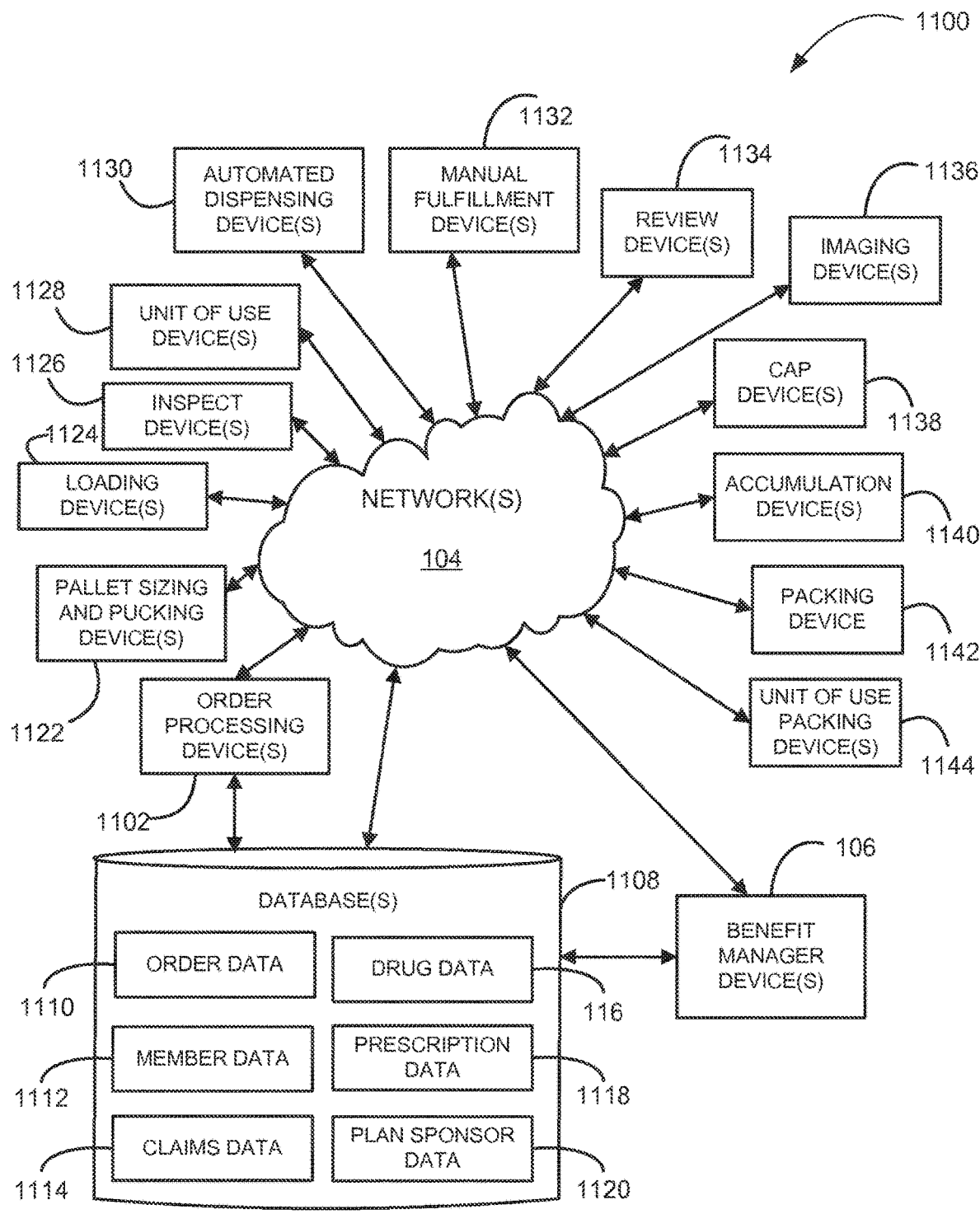
FIG. 11 is a block diagram of an example system, according to an example embodiment.

FIG. 11 is a block diagram of an example system 1100, according to an example embodiment. While the system 1100 is generally described as being deployed in a high volume pharmacy (e.g., a mail order pharmacy, a direct delivery pharmacy, and the like), the system 1100 may otherwise be deployed.

The system 1100 is an example system in which the pack out materials and configuration subsystem 202 may be deployed in an order processing device 1102, the network manager device 1106, and/or the manual fulfillment device 132, or otherwise.

The system 1100 may include the order processing device 1102 in communication with the benefit manager device 106 over the network 104. The order processing device 1102 may receive information about prescriptions being filled at a pharmacy in which the order processing device 1102 is deployed. The order processing device 1102 may track a prescription order as it is fulfilled. A prescription order may include one or more than one prescription to be filled by the pharmacy. The pharmacy routing decisions include what device or devices in the pharmacy are responsible for filling at least a portion of the prescription order, where the order consolidation decisions include whether portions of a prescription order or multiple prescription orders should be shipped together for a patient or a patient family. The order processing device 1102 may make pharmacy routing decisions and/or order consolidation decisions for a prescription order. The order processing device 1102 may operate on its own or in combination with the benefit manager device 106.

In some embodiments, at least some of the functionality of the order processing device 1102 may be included in the benefit manager device 106. The order processing device 1102 may be in a client-server relationship with the benefit manager device 106, a peer-to-peer relationship with the benefit manager device 106, or in a different type of relationship with the benefit manager device 106.

The order processing device 1102 and/or the benefit manager device 106 may be in communication directly (e.g., through local storage or peer-to-peer connection(s)) and/or through the network 104 (e.g., in a cloud configuration or software-as-a-service) with a database 108 (e.g., as may be retained in memory or otherwise). The database 1108 may be deployed on the order processing device 1102, the benefit manager device 106, on another device of the system 100, or otherwise. The database 1108 may store order data 1110, member data 1112, claims data 1114, drug data 116, prescription data 1118, and/or plan sponsor data 1120. Other data may be stored in the database 1108.

The order data 1110 may include data related to the order of prescriptions including the type (e.g., drug name and strength) and quantity of each prescription in a prescription order. The order data 1110 may also include data used for completion of the prescription, such as prescription materials. In general, prescription materials are a type of order materials that include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, or the like.

The member data 1112 includes information regarding the members associated with the benefit manager. Examples of the member data 1112 include name, address, telephone number, e-mail address, prescription drug history, and the like. The member data 1112 may include a plan sponsor identifier that identifies the plan sponsor associated with the member and/or a member identifier that identifies the member to the plan sponsor. The member data 1112 may include a member identifier that identifies the plan sponsor associated with the patient and/or a patient identifier that identifies the patient to the plan sponsor. The member data 1112 may also include, by way of example, dispensation preferences such as type of label, type of cap, message preferences, language preferences, or the like. The member data 1112 may be accessed by various devices in the pharmacy to obtain information utilized for fulfillment and shipping of prescription orders.

In some embodiments, the member data 1112 may include information for persons who are patients of the pharmacy but are not members in a benefit plan being provided by the benefit manager. For example, these patients may obtain drug directly from the pharmacy, through a private label service offered by the pharmacy, or otherwise. In general, the use of the terms member and patient may be used interchangeably herein.

The claims data 1114 includes information regarding pharmacy claims adjudicated by the PBM under a drug benefit program provided by the PBM for one, or more than one, plan sponsors. In general, the claims data 1114 includes an identification of the client that sponsors the drug benefit program under which the claim is made, and/or the member that purchased the prescription drug giving rise to the claim, the prescription drug that was filled by the pharmacy (e.g., the national drug code number), the dispensing date, generic indicator, GPI number, medication class, the cost of the prescription drug provided under the drug benefit program, the copay/coinsurance amount, rebate information, and/or member eligibility. Additional information may be included.

In some embodiments, other types of claims may be stored in the claims data 1114. For example, medical claims, dental claims, wellness claims, or other type of health care-related claims for members may be stored as a portion of the claims data 1114.

The prescription data 1118 may include information regarding prescriptions that may be issued by prescribers on behalf of patients, who may be members of the drug benefit plan, for example to be filled by a pharmacy. Examples of the prescription data 1118 include patient names, medication or treatment (such as lab tests), dosing information, and the like. The prescriptions may be electronic prescriptions, paper prescriptions that have been scanned, or otherwise. In some embodiments, the dosing information reflects a frequency of use (e.g., once a day, twice a day, before each meal, etc.) and a duration of use (e.g., a few days, a week, a few weeks, a month, etc.).

In some embodiments, the order data 1110 may be linked to associated member data 1112, claims data 1114, drug data 116, and/or prescription data 1118.

The plan sponsor data 1120 includes information regarding the plan sponsors of the benefit manager. Examples of the plan sponsor data 1120 include company name, company address, contact name, contact telephone number, contact e-mail address, and the like.

The system 1100 may include a pallet sizing and pucking device 1122, a loading device 1124, an inspect device 1126, a unit of use device 1128, an automated dispensing device 1130, a manual fulfillment device 1132, a review device 1134, an imaging device 1136, a cap device 1138, an accumulation device 1140, a packing device 1142, and/or a unit of use packing device 1144. The system may also include additional devices. The order processing device 1102 may direct at least some of the operations of these devices 1122-1144. In some embodiments, operations performed by one of these devices 1122-1144 may be performed sequentially, or in parallel with the operations of another device as may be coordinated by the order processing device 1102.

In some embodiments, the system 1100 may transport prescription drug containers by use of pallets. The pallet sizing and pucking device 1122 may configure pucks in a pallet. A pallet may be a transport structure for a number of prescription containers, and may include a number of cavities. A puck may be placed in one or more than one of the cavities in a pallet by the pallet sizing and pucking device 1122. A puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 1102 based on prescriptions which the order processing device 1102 decides to launch. In general, prescription orders reside in one or more than one queues, and are generally launched in a first-in-first-out order. However, the order processing device 1102 may use logic and a variety of factors to determine when and how prescriptions are to be launched. For example, some non-limiting factors which may alter the first-in-first-out order of launching prescriptions in a pharmacy include the age of the order, whether the order required an outreach to a physician or some other intervention, whether there are any performance guarantees with plan sponsors or members, the available inventory of a given pharmaceutical in view of existing prescriptions already launched which will require that pharmaceutical, the zip code to which the order will be shipped, the workload and volume of various parts of the pharmacy, whether valid paperwork for the order has been received, and/or similar orders for the same pharmaceutical that are already to be launched. The logic may be implanted directly in the pallet sizing and pucking device 1124, in the order processing device 1102, in both devices 1102, 1124, or otherwise. Once a prescription is set to be launched, a puck suitable for the appropriate size of container for that prescription may be positioned in a pallet by a robotic arm or pickers. The pallet sizing and pucking device 1122 may launch a pallet once pucks have been configured in the pallet.

The loading device 1124 may load prescription containers into the pucks on a pallet by a robotic arm, pick and place mechanism, or the like. In one embodiment, the loading device 1124 has robotic arms or pickers to grasp a prescription container and move it to and from a pallet. The loading device 1124 may also print a label which is appropriate for a container that is to be loaded onto the pallet, and apply the label to the container. The pallet may be located on a conveyor assembly during these operations.

The inspect device 1126 may verify that containers in a pallet are correctly labeled and in the correct spot on the pallet. The inspect device 1126 may scan the label on one or more than one container on the pallet. Labels of containers may be scanned or imaged in full or in part. Such imaging may occur after the container has been lifted out of its puck by a robotic arm, picker, or the like, or may be otherwise scanned or imaged while retained in the puck.

The unit of use device 1128 may temporarily store, monitor, label and/or dispense unit of use products. In general, unit of use products are prescription drug products that may be delivered to a patient or member without being repackaged at the pharmacy. These products may include pills in container, pills in a blister pack, inhalers, and the like.

The automated dispensing device 1130 may include one or more devices that dispense prescription drugs or pharmaceuticals into prescription containers in accordance with one or more prescription orders. In general, the automated dispensing device 1130 may include mechanical and electronic components with, in some embodiments, software and/or logic to facilitate pharmaceutical dispensing that would otherwise be performed in a manual fashion by a pharmacist and/or pharmacist technician. For example, the automated dispensing device 1130 may include blister pack machines that dispense and pack drugs into a blister pack.

The manual fulfillment device 1132 may provide for manually fulfilling prescriptions. For example, the manual fulfillment device 1132 may receive or obtain a container and enable fulfillment of the container by a pharmacist or pharmacy technician. In some embodiments, the manual fulfillment device 1132 provides the filled container to another device in the system 1100 the container to be joined with other containers in a prescription order for a patient or member. In general, a manual fulfillment may include operations at least partially performed by a pharmacist or pharmacy technician. For example, a person may retrieve a supply of the prescribed drug, may make an observation, may count out a prescribed quantity of drugs and place them into a prescription container, or the like. Some portions of the manual fulfillment process may be automated by use of a machine. For example, counting of capsules, tablets, or pills may be at least partially automated (e.g., through use of a pill counter).

The review device 1134 may process prescription containers to be reviewed by a pharmacist for proper pill count, exception handling, prescription verification, and the like. Fulfilled prescriptions may be manually reviewed and/or verified by a pharmacist, as may be required by state or local law. A pharmacist or other licensed pharmacy person who may dispense certain drugs in compliance with local and/or other laws may operate the review device 1134 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been cancelled, containers with defects, and the like.

The imaging device 1136 may image containers once they have been filled with pharmaceuticals. The imaging device 1136 may measure the fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon.

The cap device 1138 may be used to cap a prescription container. In some embodiments, the cap device 1138 may provide a type of cap in accordance with a patient preference (e.g., a preference regarding child resistance), a plan sponsor preference, prescriber preference, or the like. The cap device 1138 may also etch a message into the cap, although this process may be performed by a subsequent device.

The accumulation device 1140 accumulates various containers of prescription drugs in a prescription order. The accumulation device 1140 may accumulate prescription containers from various areas of the pharmacy. For example, the accumulation device 1140 may accumulate prescription containers from the unit of use device 1128, the automated dispensing device 1130, the manual fulfillment device 1132, and the review device 1134.

The packing device 1142 packages a prescription order in preparation for shipping the order. The packing device 1142 may box or bag the fulfilled prescription order for delivery. The packing device 1142 may further place inserts into the box or bag. For example, bulk prescription orders may be shipped in a box, while other prescription orders may be shipped in a bag which may be a wrap seal bag. The packing device 1142 may label the box or bag with the address and a recipient's name. The packing device 1142 may sort the box or bag for mailing in an efficient manner (e.g., sort by delivery address). The packing device 1142 may include ice or temperature sensitive processing for prescriptions which are to be kept within a temperature range during shipping in order to retain efficacy or otherwise. The ultimate package may then be shipped through postal mail, through a mail order delivery service that ships via group and/or air (e.g., UPS, FedEx, or DHL), through delivery service, through a local delivery service (e.g., a courier service), through a locker box at a shipping site (e.g., an AMAZON locker or a post office box), or otherwise.

The unit of use packing device 1144 packages a unit of use prescription order in preparation for shipping the order. The unit of use packing device 1144 may include manual scanning of containers to be bagged for shipping to verify each container in the order.

While the system 1100 in FIG. 1 is shown to include single devices 1102, 106, 1122-1144 multiple devices may be used. The devices 1102, 106, 1122-1144 may be the same type or model of device or may be different device types or models. When multiple devices are present, the multiple devices may be of the same device type or models or may be a different device type or model. Moreover, system 1100 shows a single network 104; however, multiple networks can be used. The multiple networks may communicate in series with each other to link the devices 1102, 106, 1122-1144 or in parallel to link the devices 1102, 106, 1122-1144. Multiple devices may share processing and/or memory resources. The devices 1102, 106, 1122-1144 may be located in the same area or in different locations. For example, the devices 1102, 106, 1122-1144 may be located in a building or set of adjoining buildings. The devices 1102, 106, 1122-1144 may be interconnected (e.g. by conveyors), networked, and/or otherwise in contact with one another or integrated with one another. In addition, the functionality of a device may be split among a number of discrete devices and/or combined with other devices.

The system 1100 may include a single database, or multiple databases, maintained by respective devices operated by or on behalf one or a number of different persons and/or organizations. The communication may occur directly (e.g., through local storage) and/or through the network 104 (e.g., in a cloud configuration or software-as-a-service) with a device that stores a respective database. FIG. 11 represents an example deployment of the database 1108. However, the system 1100 is not limited to this configuration. The database 1108 may be deployed separately from and/or one or more than one of the devices 1102, 106, 1122-1144, partially on more than one of the devices 1102, 106, 1122-1144, or may otherwise be deployed. The deployment may occur on local storage, remote storage, removable storage, and/or a different type of storage associated with the devices 1102, 106, 1122-1144. Additionally, while a single database is generally depicted, multiple databases may be implemented. In the case of multiple databases, the different databases may be deployed on different systems, including the devices 1102, 106, 1122-1144 and/or a third-party device or network.

Figure 12:
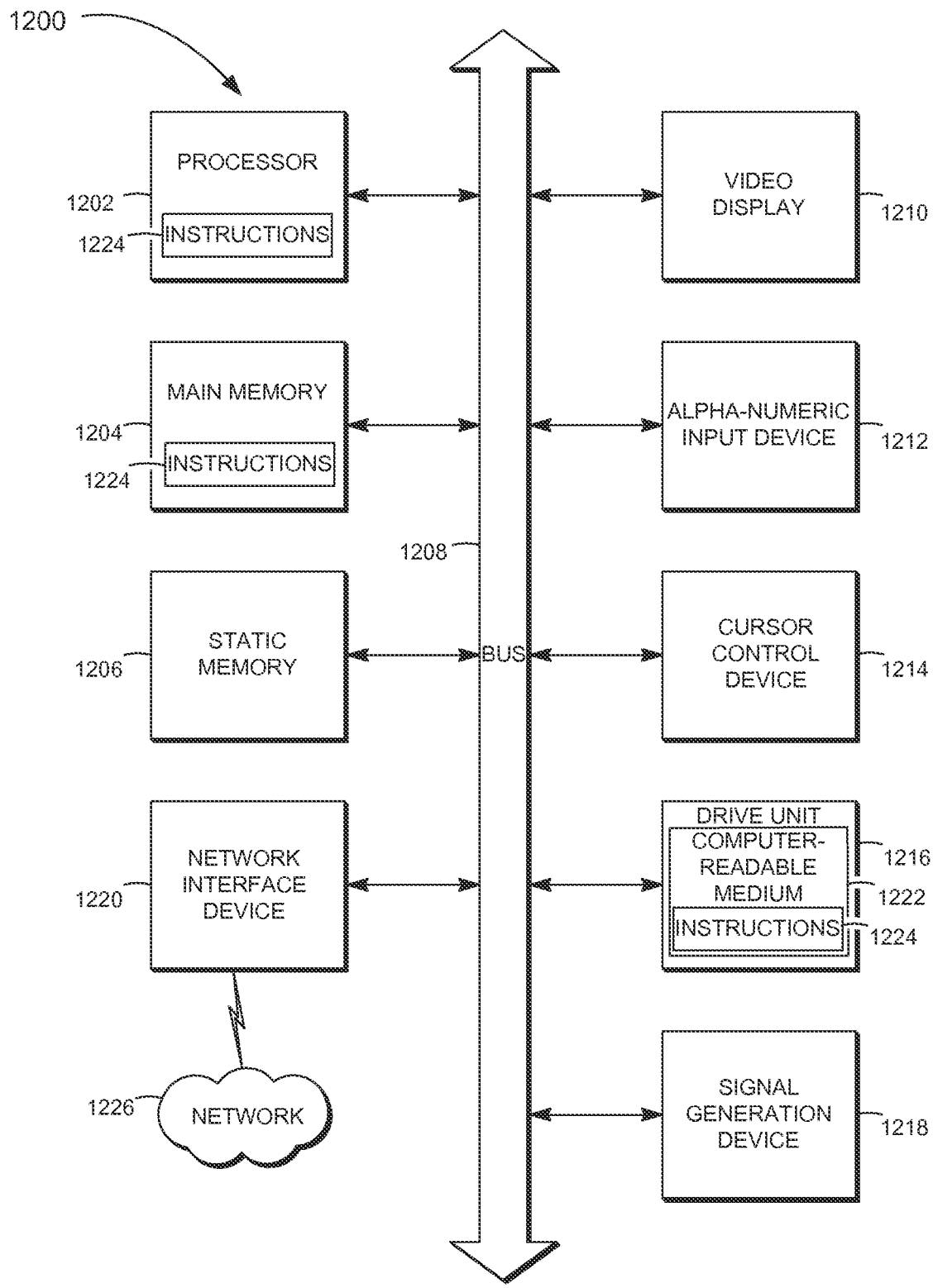
FIG. 12 is a block diagram of a machine in the example form of a computer system within which a set of instructions for causing the machine to perform any one or more of the methodologies discussed herein may be executed or stored.

FIG. 12 shows a block diagram of a machine in the example form of a computer system 1200 within which a set of instructions may be executed causing the machine to perform any one or more of the methods, processes, operations, or methodologies discussed herein. The devices 102, 106, 108, 1102, 1122-1144 may include the functionality of the one or more computer systems 1200.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a gaming device, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU) a graphics processing unit (GPU) or both), a main memory 1204 and a static memory 1206, which communicate with each other via a bus 1208. The computer system 1200 further includes a video display unit 1210 (e.g., a liquid crystal display (LCD) or a cathode ray tube (CRT)). The computer system 1200 also includes an alphanumeric input device 1212 (e.g., a keyboard), a cursor control device 1214 (e.g., a mouse), a drive unit 1216, a signal generation device 1218 (e.g., a speaker) and a network interface device 1220.

The drive unit 1216 includes a computer-readable medium 1222 on which is stored one or more sets of instructions (e.g., software 1224) embodying any one or more of the methodologies or functions described herein. The software 1224 may also reside, completely or at least partially, within the main memory 1204 and/or within the processor 1202 during execution thereof by the computer system 1200, the main memory 1204 and the processor 1202 also constituting computer-readable media.

The software 1224 may further be transmitted or received over a network 1226 via the network interface device 1220.

While the computer-readable medium 1222 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present invention. The term "computer-readable medium" shall accordingly be taken to include, but not be limited to, solid-state memories, and optical media, and magnetic media. In some embodiments, the computer-readable medium is a non-transitory computer-readable medium.

The term "based on" or using, as used herein, reflects an open-ended term that can reflect others elements beyond those explicitly recited.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled.

The inventive subject matter may be represented in a variety of different embodiments of which there are many possible permutations.

In an example embodiment, a shipping temperature for a prescription drug is identified. An origin forecasted temperature for a shipping origin of the prescription drug and a destination forecasted temperature for a shipping destination of the prescription drug are determined. A shipping container with the prescription drug to ship the prescription drug to the shipping destination is associated. An expected shipment duration associated with delivery of the prescription drug to the shipping destination is associated. The expected shipping duration may be based on a shipping carrier and a shipping mode. Temperature model data associated with the shipping container is accessed. A determination that the prescription drug is capable of maintaining the shipping temperature between the shipping origin and the shipping destination based on the shipping temperature, the origin forecasted temperature, the destination forecasted temperature, association of the shipping container, the expected shipment duration, and the temperature model data associated with the shipping container is made.

In an example embodiment, a shipping temperature for a prescription drug is identified. An origin forecasted temperature for a shipping origin of the prescription drug and a destination forecasted temperature for a shipping destination of the prescription drug are determined. A first shipping container is associated with the prescription drug to ship the prescription drug to the shipping destination. A first expected shipment duration associated with delivery of the prescription drug to the shipping destination is associated. The first expected shipping duration may be based on a first shipping carrier and a first shipping mode. A shipping configuration is selected for the first shipping container. The shipping configuration may include a phase change unit and the prescription drug. The temperature model data associated with the first shipping container may be accessed. A determination that the prescription drug is capable of maintaining the shipping temperature between the shipping origin and the shipping destination within the first shipping container and having the shipping configuration based on the shipping temperature, the origin forecasted temperature, the destination forecasted temperature, association of the first shipping container, the first expected shipment duration, the temperature model data associated with the first shipping container, and the shipping configuration of the first shipping container is made. A second shipping container is associated with the prescription drug to ship the prescription drug to the shipping destination. A second expected shipment duration associated with delivery of the prescription drug to the shipping destination is associated. The second expected shipping duration may be based on a second shipping carrier and a second shipping mode. The shipping configuration is selected for the second shipping container. The temperature model data associated with the second shipping container is accessed. A determination that the prescription drug is capable of maintaining the shipping temperature between the shipping origin and the shipping destination within the second shipping container and having the shipping configuration based on the shipping temperature, the origin forecasted temperature, the destination forecasted temperature, association of the second shipping container, the second expected shipment duration, the temperature model data associated with the second shipping container, and the shipping configuration of the second shipping container is made. A determination that the cost to ship the prescription drug by the first shipping container is less than the second shipping container is made. The first shipping container is selected to ship the prescription drug.

In an example embodiment, a shipping temperature for a prescription drug may be identified. A forecast temperature may be determined. One or more potential packing configurations capable of achieving the shipping temperature between the shipping origin and the shipping destination may be determined. A shipping cost for each of the one or more potential packing configurations may be calculated. An overall cost for each of the one or more potential packing configurations may be calculated.

Thus, methods and systems for determining a preferred shipping configuration for shipping temperature sensitive drugs from a pharmacy to an individual seeking a fill of a prescription for the temperature sensitive drugs have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion. Although "End" blocks are shown in the flowcharts, the methods may be performed continuously.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A mail order pharmacy system comprising:
    an order processing device to:
        associate an expected shipping duration associated with delivery of a prescription drug to a shipping destination, the expected shipping duration being based on a shipping carrier and a shipping mode;
        selectively adjust the expected shipping duration in response to a known shipping delay;
        determine an origin forecasted temperature for a shipping origin of the prescription drug and a destination forecasted temperature for the shipping destination of the prescription drug,
        associate a shipping container with the prescription drug to ship the prescription drug to the shipping destination,
        access temperature model data associated with the shipping container, and
        determine a predicted temperature of the prescription drug at the shipping destination based on (i) forecasted temperatures to be experienced by the shipping container along a shipping route from the shipping origin to the shipping destination, (ii) the expected shipping duration, (iii) the temperature model data associated with the shipping container, (iv) a next pickup time based on a specific carrier indicated by the shipping mode, (v) an associated storage location of the prescription drug prior to the next pickup time of the specific carrier, and (vi) a difference between a time of packing and the next pickup time of the specific carrier, the forecasted temperatures to be experienced by the shipping container being based on the origin forecasted temperature and the destination forecasted temperature; and
    a transport mechanism to transport the prescription drug to a packing device, the packing device being controlled by a processor,
    the packing device to:
        communicate with the processor directly or indirectly,
        under control of the processor, receive the prescription drug from the transport mechanism, and
        under control of the processor, package the prescription drug within the shipping container in response to the predicted temperature meeting a temperature-related storage requirement of the prescription drug.

2. The system of claim 1 wherein the order processing device is further configured to:
    select a shipping configuration among a plurality of shipping configurations, the shipping configuration including insertion of a phase change unit and the prescription drug within the shipping container,
    wherein a determination of the predicted temperature of the prescription drug at the shipping destination is further based on selection of the shipping configuration.

3. The system of claim 2 wherein the order processing device is further configured to:
    verify the phase change unit is retainable in the shipping container with the prescription drug in accordance with the shipping configuration.

4. The system of claim 3 wherein verification that the phase change unit is retainable in the shipping container with the prescription drug comprises:
    performing a cubing technique on the shipping container relative to the prescription drug and the phase change unit.

5. The system of claim 1 wherein the order processing device is further configured to:
    access a safety factor associated with the shipping carrier and the shipping mode, the safety factor being based upon experimentally derived data to account for a variance between forecast temperature data and shipping temperature data,
    wherein a determination of the predicted temperature of the prescription drug at the shipping destination is further based on the safety factor.

6. The system of claim 1 wherein the order processing device is further configured to:
    schedule a prescription drug order of the prescription drug with a patient, and
    determine an order timing of when to pack the prescription drug order for delivery of the prescription drug to the patient based on scheduling of the prescription drug order,
    wherein a determination of the predicted temperature of the prescription drug at the shipping destination is further based on the timing of when to pack the order timing.

7. The system of claim 1 wherein the transport mechanism includes a conveyor in communication with the order processing device and the packing device.

8. The system of claim 1 wherein the order processing device is further configured to:
    calculate a cost to ship the shipping container with the shipping carrier through the shipping mode.

9. The system of claim 1 wherein the order processing device is configured to determine the predicted temperature further based on respective forecast temperature offsets that are based on the origin forecasted temperature and the destination forecasted temperature.

10. The system of claim 1 wherein:
the order processing device is further configured to determine refrigeration availability of whether refrigeration of the shipping container is available before transit by the shipping carrier, during shipment by the shipping carrier, or both before transit by the shipping carrier and during shipment by the shipping carrier, and
the predicted temperature is determined based on a determination of the refrigeration availability.

11. The system of claim 1 wherein the shipping container includes a plurality of phase change units, and the order processing device is further configured to:
verify that the plurality of phase change units fit in the shipping container with the prescription drug.

12. The system of claim 1 wherein the expected shipping duration is based on the shipping carrier, the shipping mode, and allocated porch time.

13. The system of claim 1 wherein the expected shipping duration is based on an expected pickup time of the shipping container by the shipping carrier and an expected delivery time of the shipping container through the shipping carrier.

14. The system of claim 1 wherein the temperature model data is associated with the shipping container, the origin forecasted temperature, and the destination forecasted temperature.

15. The system of claim 1 further comprising:
the shipping container,
wherein the shipping container includes a cooler.

* * * * *